United States Patent [19]

Bolick, Jr. et al.

[11] 4,113,994
[45] Sep. 12, 1978

[54] DICTATION RECORDING AND TRANSCRIBING SYSTEM UTILIZING SELECTABLE DUAL MESSAGE RECORD-PLAYBACK APPARATUS

[75] Inventors: Fred C. Bolick, Jr.; Theodore Titus IV, both of Atlanta, Ga.

[73] Assignee: Lanier Business Products, Inc., Atlanta, Ga.

[21] Appl. No.: 719,423

[22] Filed: Sep. 1, 1976

[51] Int. Cl.² .................. H04M 11/10; G11B 27/10
[52] U.S. Cl. .......................... 179/100.1 DR; 179/6 E
[58] Field of Search .................. 179/100.1 DR, 6 E; 360/60–63, 69, 71–72, 74

[56] References Cited

U.S. PATENT DOCUMENTS

| 2,784,258 | 3/1957 | Sharpe | 179/100.1 DR |
|---|---|---|---|
| 3,222,460 | 12/1965 | Albanes et al. | 179/100.1 DR |
| 3,766,326 | 10/1973 | Buchholz et al. | 179/100.1 DR |
| 3,903,368 | 9/1975 | Okamara | 179/100.1 DR |
| 3,911,482 | 10/1975 | Kolb et al. | 179/100.1 DR |
| 4,007,491 | 2/1977 | Bolick, Jr. et al. | 179/100.1 DR |
| 4,024,354 | 5/1977 | Bolick, Jr. et al. | 179/100.1 DR |

Primary Examiner—Raymond F. Cardillo, Jr.
Attorney, Agent, or Firm—Jones, Thomas & Askew

[57] ABSTRACT

Dictation system including a dictation recording and transcribing unit which utilizes two discrete recording media for recording a first dictated message on one recording medium at the same time that a previously recorded second message can be transcribed from the other recording medium. Each of the two recording media, which are tape cassettes in the disclosed embodiment, is manipulated by separate and independent medium-handling devices within the dictation unit. The dictation unit, which is intended to be located at a transcribing location and interconnected with one or more remotely-located dictate stations, includes the audio and control functions necessary for recording dictation and for transcribing previously-recorded dictation, and these audio and control functions can be interchanged between either of the two recording media. Transfer of the dictating and transcribing functions between the two recording media is accomplished by a single control, and safeguards are provided to prevent transcriber interference with the audio or control functions of the selected recording medium on which dictation is being currently recorded. The system allows the dictator to record selected information signals along with the audio messages being recorded on a selected recording medium, and playback of previously-recorded information signals provides operational control determined by the recording or transcribing function which is selected for the particular recording medium.

15 Claims, 8 Drawing Figures

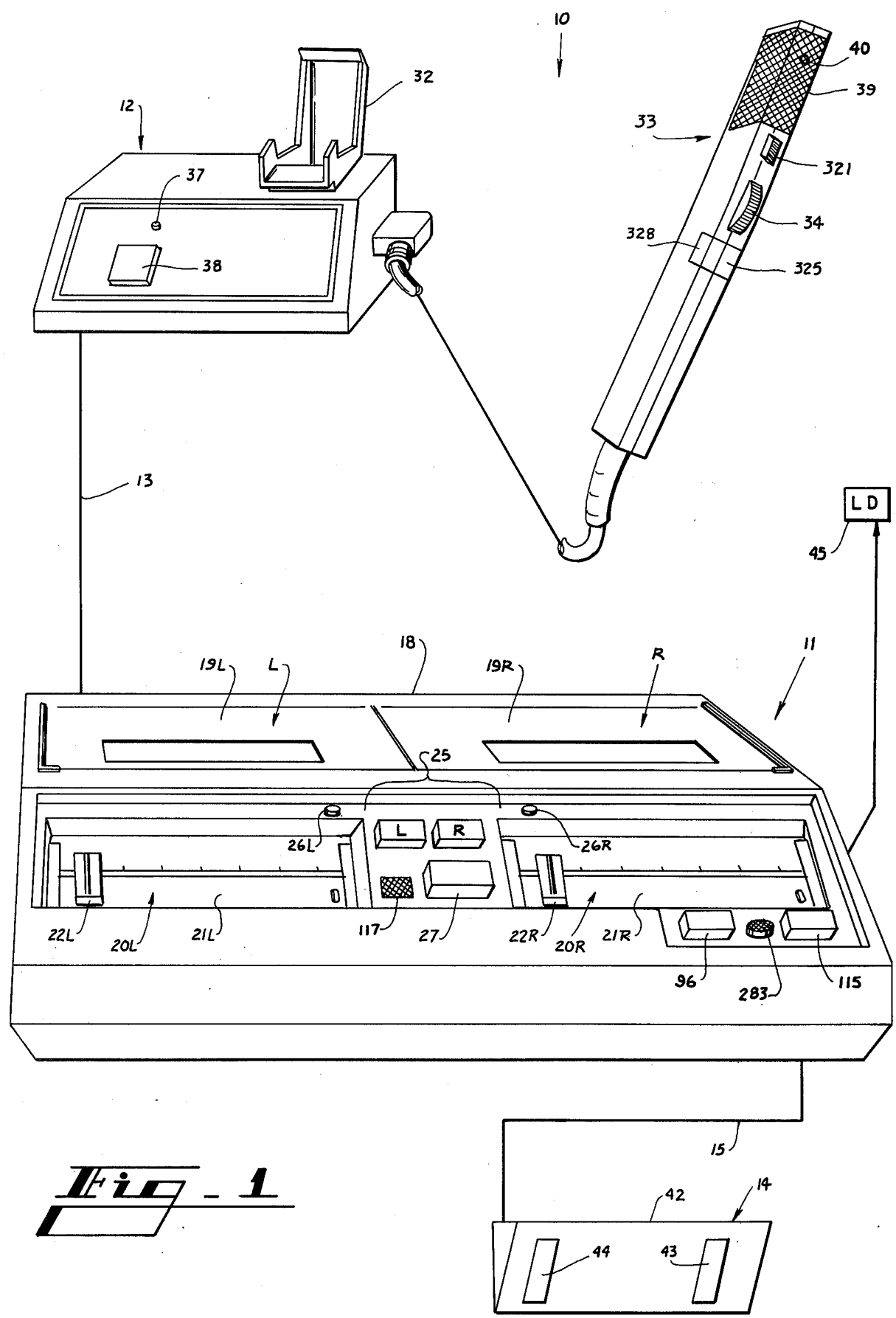

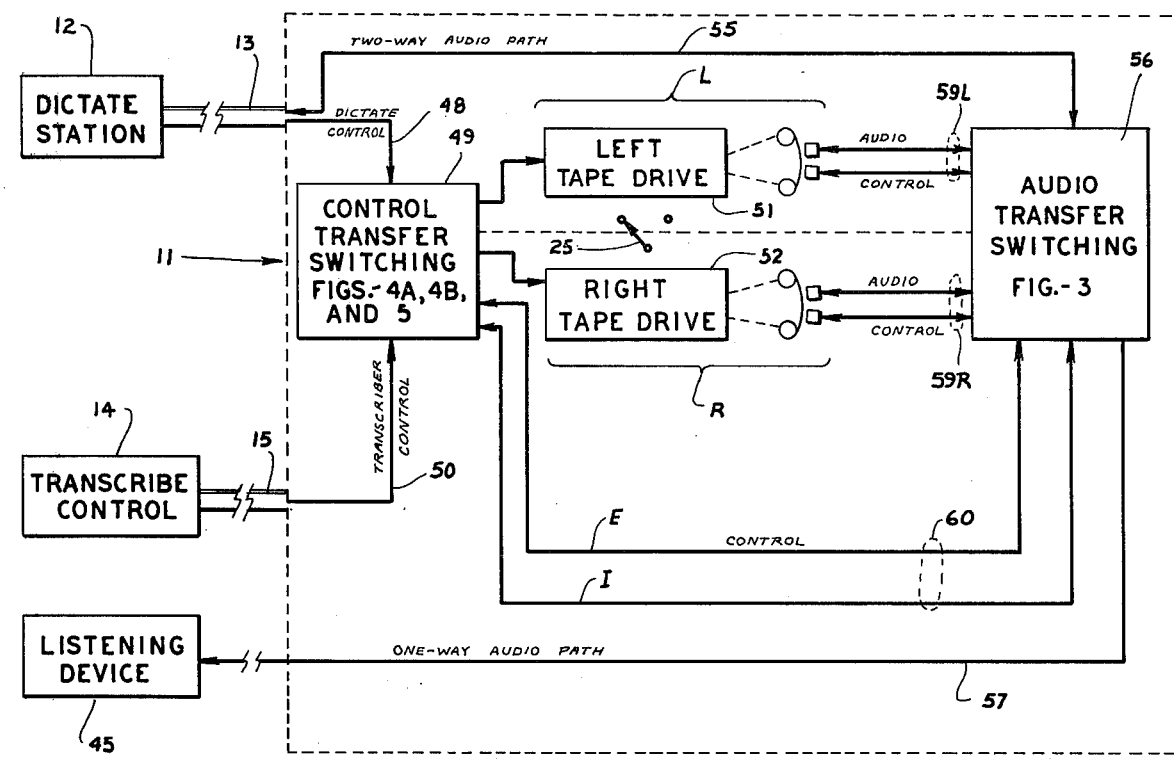
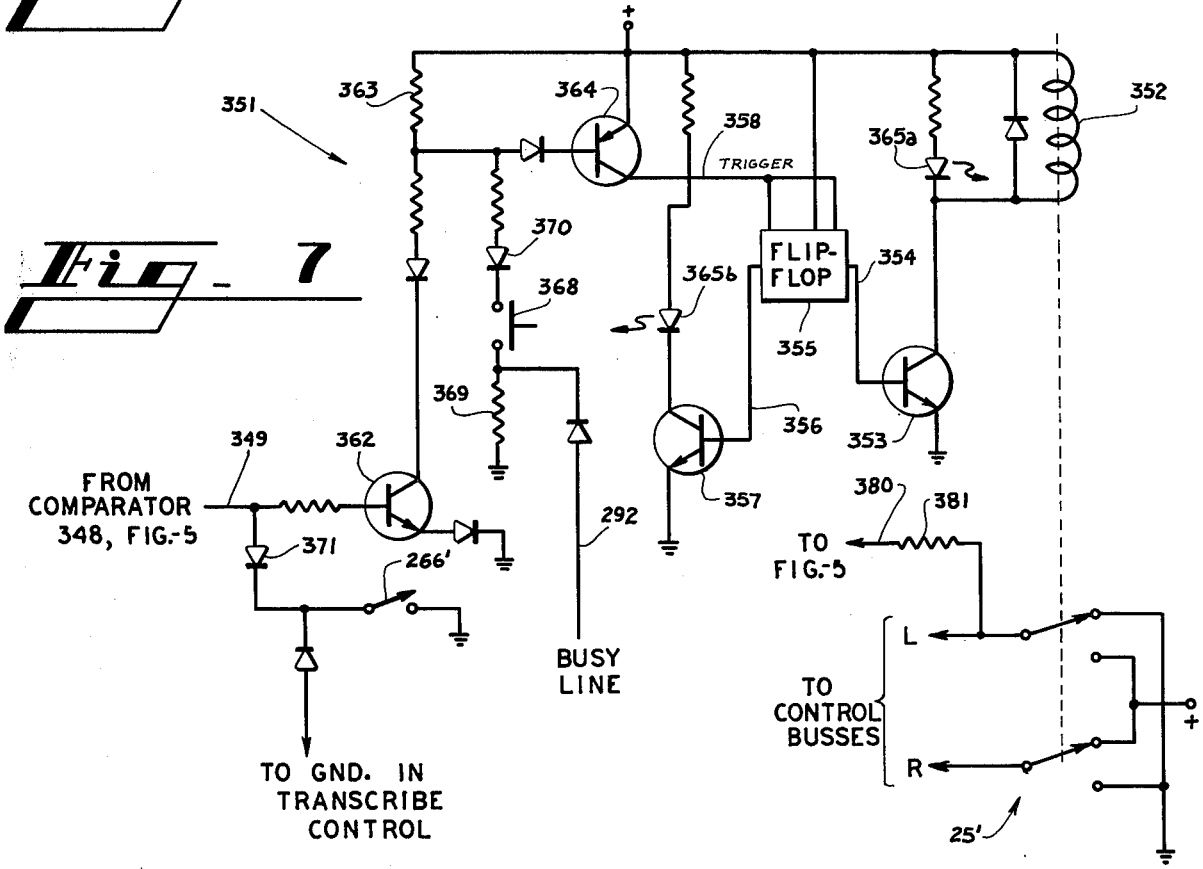

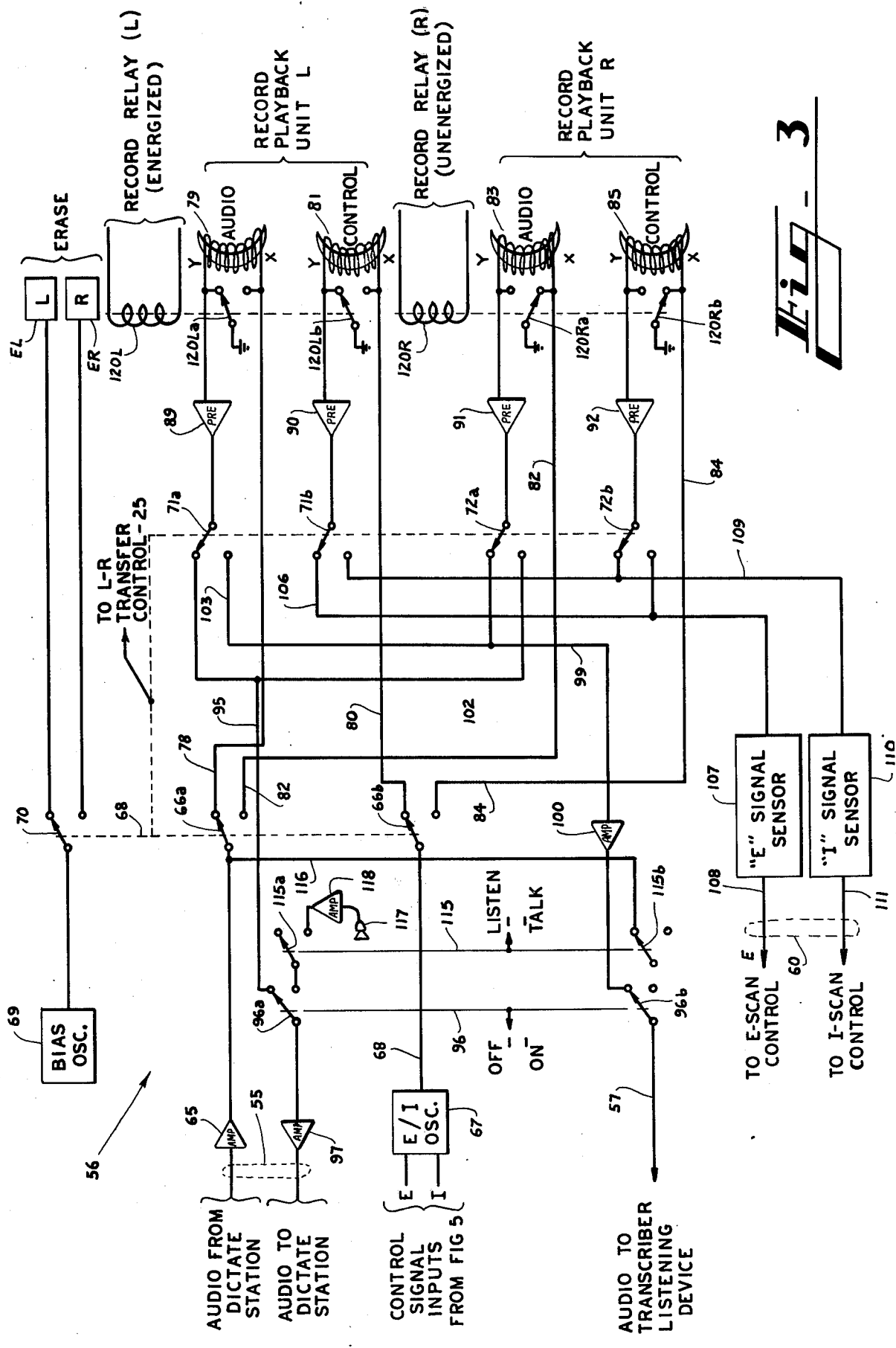

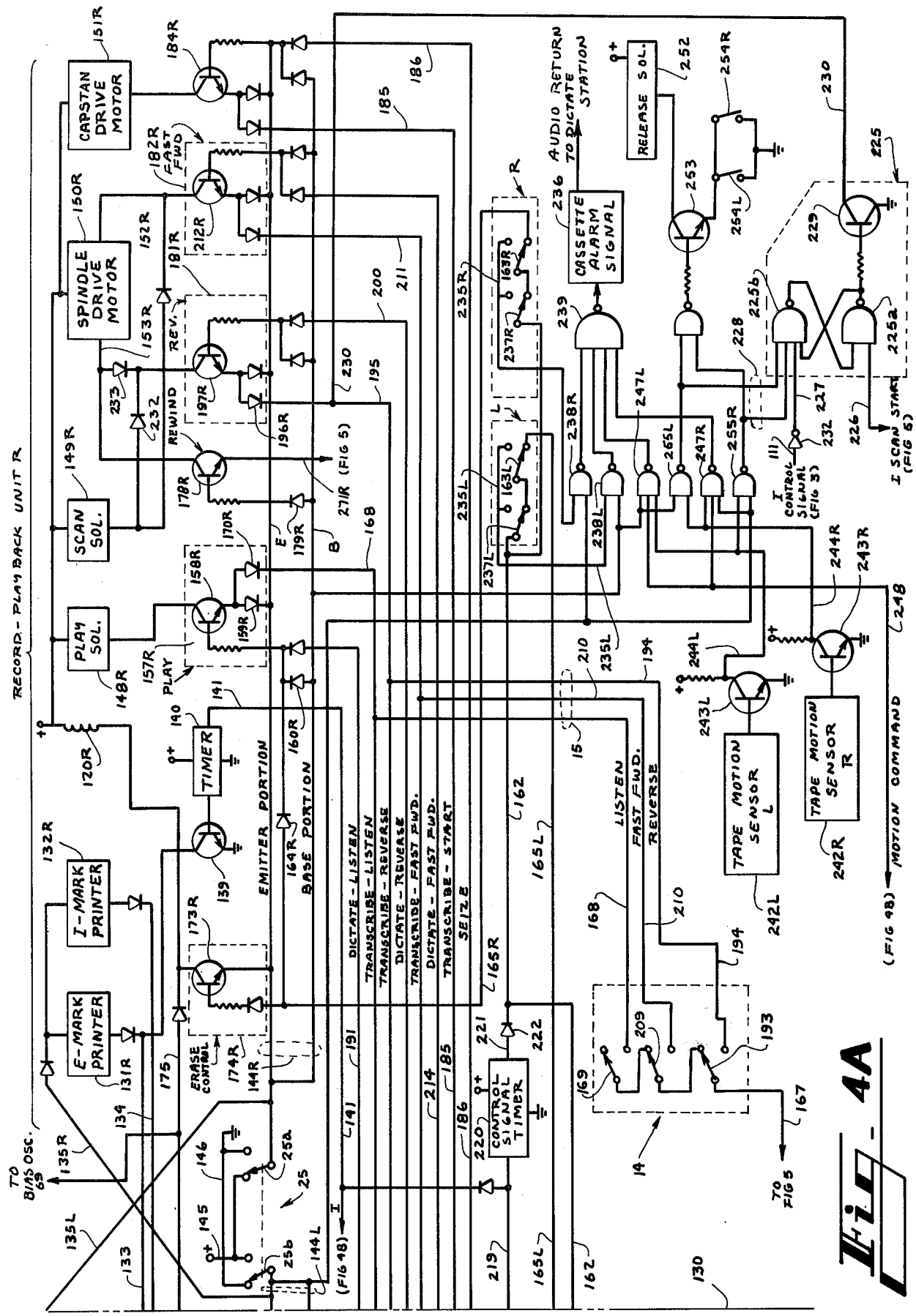

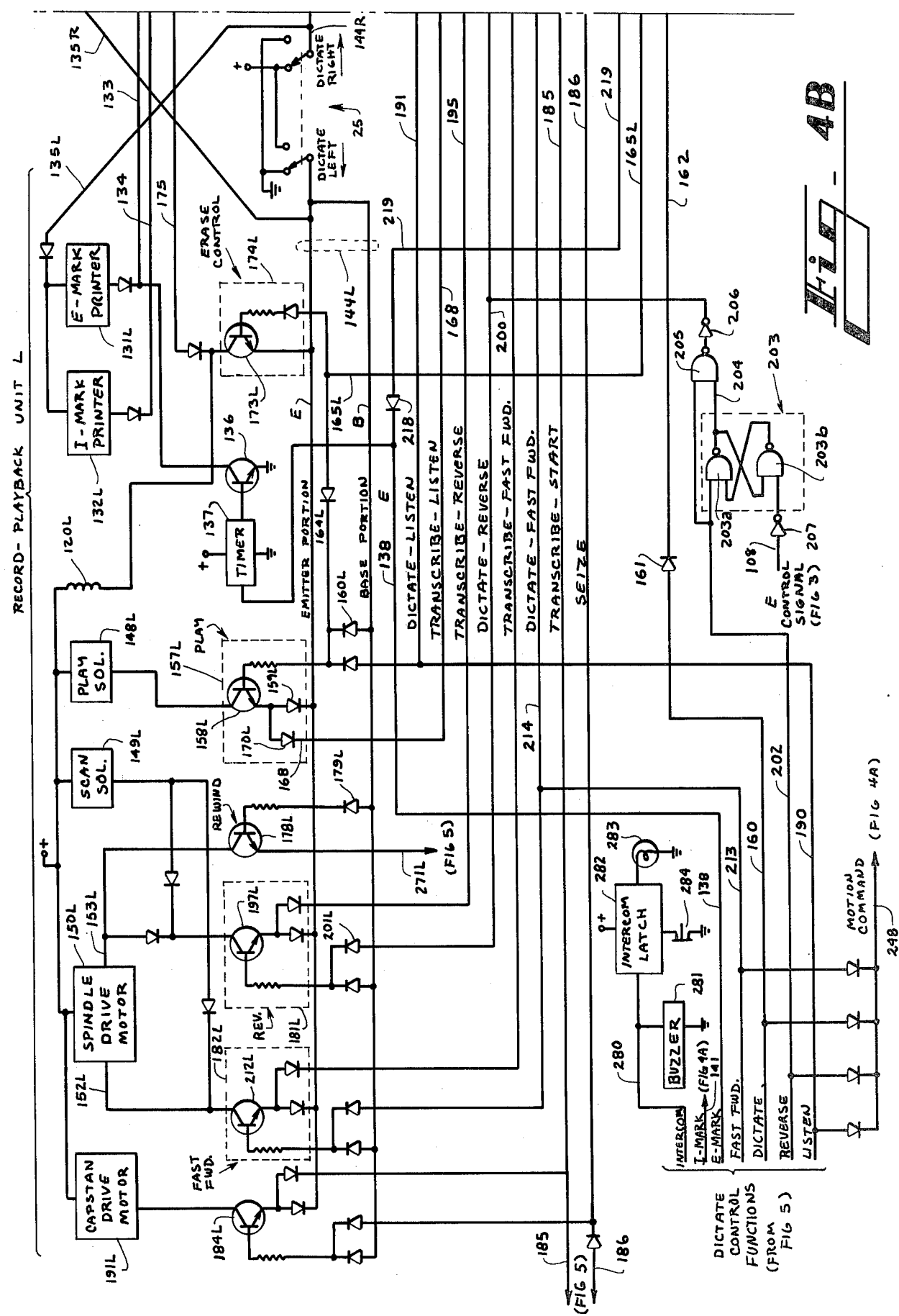

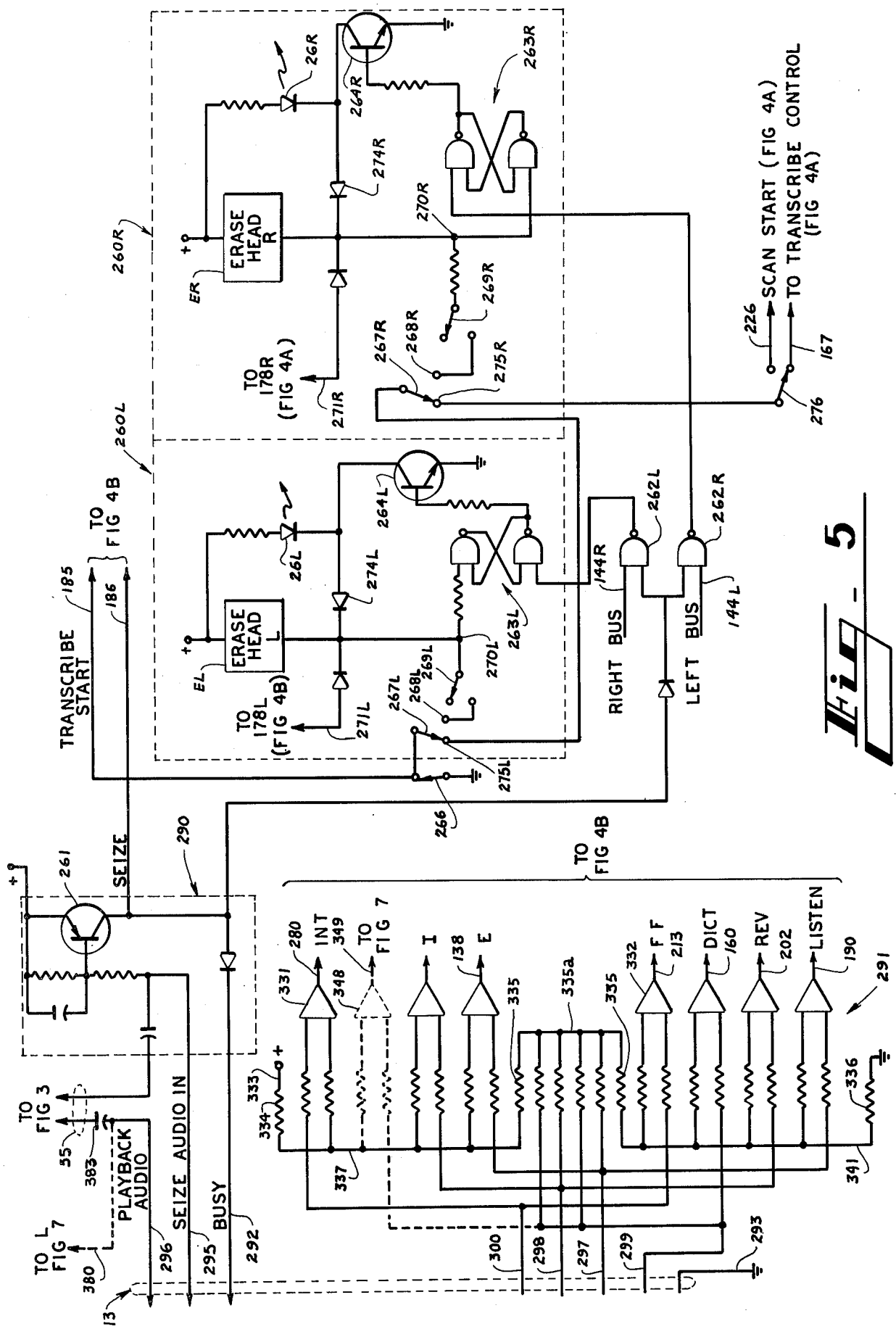

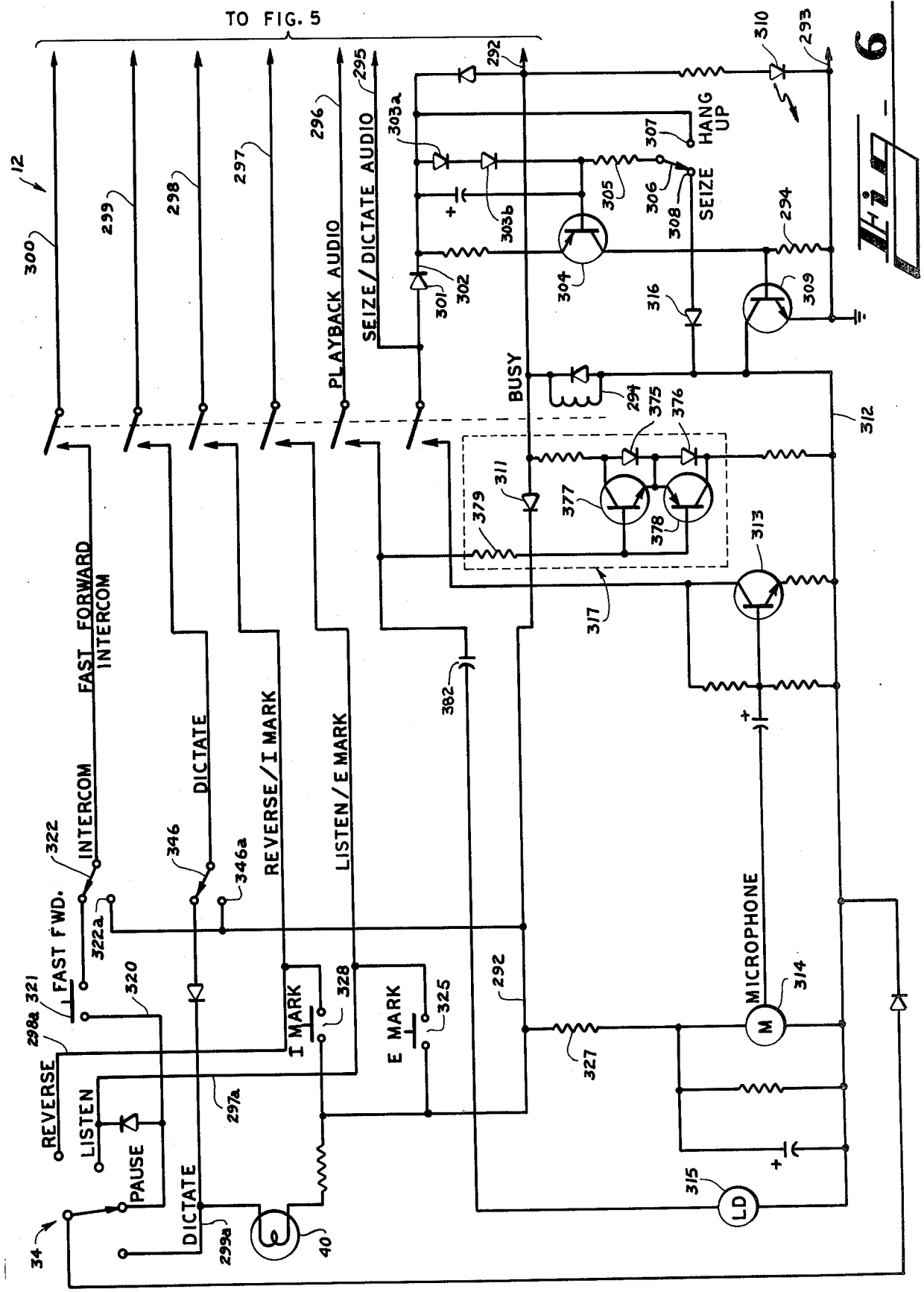

DICTATION RECORDING AND TRANSCRIBING SYSTEM UTILIZING SELECTABLE DUAL MESSAGE RECORD-PLAYBACK APPARATUS

This invention relates in general to dictation recording and transcription systems, and in particular to a dictation system for simultaneous dictation and transcription on discrete recording media.

Dictation recording and transcription systems of the prior art can be generally categorized according to the location of the dictation recording and transcribing equipment, whether local or central. The so-called local type of equipment utilizes a separate independent dictation recorder for each desk or other location where dictation is to be recorded. Dictated messages or other information are recorded onto a disc, cassette, belt, or other individual recording medium separately associated with each dictation recorder. The recording medium must thereafter be manually transferred from the dictation recorder to a dictation transcriber, which is a separate independent transcription playback device that is typically located at a secretary's work station. Messages or other information that are dictated with such localized equipment obviously cannot be transcribed until the cassette or other recording medium is physically transferred from the dictator's location to the transcriber's work station, an event which may occur only some time after the actual dictation has been completed.

Another category of dictation recording and transcribing equipment, frequently referred to as "central dictation system," involves one or more dictate stations that are electrically connected to a remotely-located central dictation recorder. Some central dictation systems use a dictation record-playback apparatus having an endless loop of recording tape within a bin, along with tape movement and control devices that move the tape from one location to another location within the bin as dictated messages from the dictate station are recorded and transcribed. A transcribe station, which may also be located remotely from the central recorder transcriber apparatus, controls movement of the endless tape with respect to a transcription playback mechanism located within the bin. Endless tape bin-type dictation systems require no manual handling of the recording medium, and allow transcription of a dictated message to commence almost as soon as the dictation itself commences. Bin-type central dictation systems tend to be more expensive than local-equipment dictation systems for some types of applications, however, and the serial nature of transcription with bin systems makes it difficult to extract priority dictation for transcription out of sequence with other dictated messages on the endless tape within the bin.

Another type of central dictation system utilizes changeable discrete media for recording messages which are dictated at one or more remotely-located dictate stations. Such discrete-media central dictation systems may utilize recording media such as cassettes which are automatically changeable with apparatus such as shown in pending U.S. patent application Ser. No. 554,476, filed Mar. 3, 1975, now U.S. Pat. No. 4,024,354 and individual cassettes containing dictated messages must be transferred from the central recorder to transcribing equipment located at a secretarial work station.

Other known types of discrete-medium central dictation systems employ a number of separate dictation recording machines each of which contains a single recording medium, and all of which are selectably connectable through an automatic transfer switching mechanism to a remote dictate station. The expense of the latter type of system is apparent, since several separate recorders must be provided in addition to the transfer mechanism and one or more separate transcription machines.

It will be understood that prior art dictating equipment which utilizes a discrete recording medium such as belts, discs, cassettes, or the like requires manual handling of the recording medium before transcription of dictated messages can commence, irrespective of whether the dictation recorder is locally situated at a dictator's desk or is remotely-located as part of a central dictation system. It will also be seen that endless-tape bin central dictation systems, while overcoming the recording medium handling problem, may be inappropriate for some applications.

Stated in general terms, the dictation recording and transcribing system of the present invention includes a dictation unit having two separate message recording means each of which can operate to record dictated messages or to transcribe previously-recorded dictated messages on a recording medium separately associated with each message recording means. The dictation unit of the present invention can be used in combination with a remotely-located dictate station and in combination with a secretarial transcriber control. Each of the separate message recording means is selectably connectable to receive and record dictation on a first recording medium, with the other such recording means remaining available for concurrent transcription of a previously-recorded message on a second recording medium. The entire dictation unit may be placed at a secretarial desk or work station, and all audio and control functions associated with recording and transcription are engaged in either recording means by a single transfer switch so that a previously-recorded message on either recording medium can be transcribed without manually transferring the recording medium from a recording location to a separate transcribing location.

Accordingly, an object of the present invention is to provide an improved dictation system.

Another object of the present invention is to provide an improved dictation system in which dictation and transcription of messages may be accomplished without the necessity of handling recording media.

It is yet another object of the present invention to provide a dictation system which enables a dictated message to be recorded on a first recording medium of a dictation unit and which enables a previously-recorded message to be concurrently transcribed from a second recording medium of the dictation unit.

Other objects and advantages of the present invention will become more apparent from the following description of a disclosed embodiment, including the drawing in which:

FIG. 1 shows a pictorial view of a dictation recording and transcribing system according to the disclosed embodiment of the present invention;

FIG. 2 is a functional block diagram broadly depicting the control transfer and audio transfer functions of the disclosed embodiment;

FIG. 3 is a block diagram more specifically showing the audio transfer switching functions of the disclosed embodiment;

FIGS. 4(A) and 4(B) constitute a schematic diagram showing the control transfer switching of the disclosed embodiment;

FIG. 5 is a schematic diagram showing dictate station control decoding, seizure circuitry, and erase controls of the disclosed embodiment;

FIG. 6 is a schematic diagram of a dictate station which forms part of the disclosed embodiment; and FIG. 7 is a schematic diagram of a modified control transfer switching arrangement according to an alternative disclosed embodiment of the present invention.

Turning to the disclosed embodiment as generally shown in FIG. 1, there is shown generally at 10 a dictation system consisting of a dictation unit 11, a dictate station 12 which is connectable to the dictation unit 11 by an interconnecting cable 13 and which may be located remotely of the dictation unit, and a transcribe control unit 14 which is connected to the dictation unit by the control cable 15. The dictation unit 11 includes a first cassette record-playback apparatus L and a second record-playback apparatus R, both of which are contained on opposite sides of a common housing 18. Each of the two record-playback units L and R are cassette tape recording units which accept the conventional Philips-type tape cassette popularly known as the compact cassette through loading doors 19L and 19R associated with the respective recorder-playback units. While cassette record-playback units have been selected for use in the disclosed embodiment of the present invention because of the widespread use and general popularity of Philips-type cassettes in dictation and other applications, it should be understood that the present invention is not limited to use with Philips cassettes or with other cassette recording media, and that other types of recording media and corresponding record-playback units can be utilized.

Associated with the left record-playback unit L is a dictation index 20L for receiving a removable markable index strip 21L. The dictation index 20L includes a position indicator 22L which is mechanically coupled with the tape transport mechanism of the first record-playback unit L in a manner known to those skilled in the art, so that the position indicator 22L traverses the index strip 21L to provide a visual indication of the amount of recorded or transcribed tape in the cassette associated with that record-playback unit. A similar dictation index 20R is positioned on the housing 18 in association with the second record-playback unit R, and is operatively coupled with that record-playback unit to provide a visual indication of the recorded or transcribed tape in a cassette associated with the unit R. Each of the position indicators 22L and 22R also includes devices for placing visible index marks on the corresponding index strips, as is discussed below.

Positioned between the record-playback units L and R are a number of controls including the keys "L" and "R" of the left-right transfer control 25, the work lamps 26L and 26R, and the automatic scan control 27. Separate erase/rewind controls for the corresponding record-playback units L and R are provided on the dictation unit 11, and are preferably located behind the respective doors 19L and 19R so that operation of the "erase" function requires a specific voluntary act which is unlikely to be inadvertently accomplished. Discussion of the "erase" control function is provided in further detail below. Conventional control functions such as secretary playback volume, tone, and speed may also be provided, as will be understood by those skilled in the art, such controls being conventional in nature and operation and forming no part of the present invention. A listening device 45 such as an earphone may be connectable to the dictation unit 11. An intercom on-off switch 96, the intercom talk-listen switch 115, and the intercom microphone 117 are located on the dictation unit 11.

The dictate station 12 includes a cradle 32 within which is received a handset 33 containing dictation function controls such as the multiposition switch 34 which controls the reverse, dictate, pause, and review-listen functions. The fast-forward control 36 is also located on the handset 33, along with the E-mark switch 325 and the I mark switch 328. The dictate station 12 may also be provided with a "busy" lamp 37, which is illuminated when a dictation recording operation is in progress, and an intercom call switch 38, which operates in a manner described below to provide an audible and/or visual signal at the dictation unit 11. A microphone and listening device are contained at 39 within the handset 33, and a record indicator lamp 40 is illuminated when dictation is actually being recorded. Details of a specific dictate station 12 associated with the disclosed embodiment of the present invention are set forth below with reference to FIG. 5.

The transcribe control unit 14, which is connected to the dictation unit 11 by the cable 15, may be a foot pedal control unit of the type commonly associated with dictation transcription apparatus. The transcribe control unit 14 of the disclosed embodiment includes a "listen" pedal 42, a "reverse" pedal 43, and a "fast-forward" pedal 44, each of which operates a corresponding switch within the transcribe control unit to control the corresponding function during dictation playback operation, as will be more apparent below.

The block diagram of FIG. 2 shows the basic audio signal and control signal transfer that occurs within the dictate unit 11 of the present system, when switching the dictate function and the transcribe function between the two record-playback units L and R. Operation of the various dictate controls at the dictate station 12 produces signals which are applied along the cable 13 and the control line pictorially indicated at 48 to the control transfer switching means 49. Operation of the transcribe control 14 also provides various control signals through the cable 15 which are applied on the line 50 to the control transfer switching means 49. While the control signals received from either the dictate station 12 or the transcribe control 14 may call for the same type of cassette tape movement, such as tape playback or reverse, it will become apparent that such tape movement command signals are associated with function control signals originating from the dictate station or the transcribe control, respectively, which are dissimilar in intended function. For instance, a tape forward movement control signal emanating from the dictate station 12 may result either from a "forward dictate" control command or a "forward listen" control command, while a similar tape movement control signal from the transcribe control unit 14 can only be a "forward listen" command signal.

The dictate control signals received by the control transfer switching means 49 are supplied either to the left tape drive 51 associated with the record-playback unit L, or to the right tape drive 52 associated with the record-playback unit R, depending on the position of the left-right transfer switch 25 which is diagrammatically shown in FIG. 2. It will be understood that the control transfer switching means 49, in response to operation of the left-right transfer switch 25, connects the dictate control functions to one of the tape drives and simultaneously connects the transcribe control functions to the other of the tape drives. The dictate station 12 is always in control of one of the two record-transcribe units L and R, accordingly, while the transcribe control 14 is always in control of the other of such units, with selection of the particular record-playback unit being determined by the position of the switch 25.

A two-way audio path indicated at 55 is present between the dictate station 12 and the audio transfer switching means 56, while a one-way audio path shown at 57 returns playback audio to the listening device 45 associated with transcribe operation of the dictation system. The audio transfer switching means operates in response to the left-right transfer switch 25 to interconnect the two-way dictation audio path and the one-way transcription audio path to the respective record-playback units L and R.

Each of the record-playback units L and R is capable of recording both audio speech signals and control signals on the tape or other recording medium, as indicated by the grouped audio and control lines 59L and 59R extending from the audio transfer switching means 56 to the respective record-playback units L and R. The "audio" signals on the lines 59L and 59R denote audio messages which are being recorded or played back on the recording medium, while the "control" line indicates control signals which are being recorded or played back. The recorded control signals are generated within the audio transfer switching means 56 in response to control signals received on the lines 60 from the control transfer switching means 49, in a manner and for the purposes described below. Further information relating to the recording, playback, and utilization of control signals in dictation recording and transcribing equipment is found with reference to copending application Ser. No. 548,543, filed Feb. 10, 1975, now U.S. Pat. No. 4,007,491. The playback of previously-recorded control signals by either of the record-playback units L or R likewise causes a control signal to be supplied along the line 60 to the control transfer switching means 49 for control of tape movement or other purposes, as discussed below.

Audio transfer switching functions of the disclosed embodiment are best understood with reference to FIG. 3. Audio input from the dictate station 12 is amplified at 65 and is thereafter applied to the audio input switch 66a. Control signal inputs from the control transfer switching means 49 are supplied to the E/I oscillator unit 67, which functions to provide characteristic control tones or other control signals on the output line 68 to the control input switch 66b. The control signal inputs to the E/I oscillator unit 67, in the present embodiment, consist of either E signals or I signals which are generated in response to actuation of corresponding switches 325 and 328 at the dictate station 12. The E signals may be used to denote the "end" of a particular dictated message, and the I signals may be used to denote an "instruction" message that is dictated on the tape. The E/I oscillator 67 functions in response to the corresponding E or I input control signal to provide corresponding mutually-distinct tone signals on the line 68.

The audio input switch 66a and the control input switch 66b are ganged together as indicated at 68 for operation in unison in response to operation of the left-right transfer switch 25. The output signal from the erase bias oscillator 69 is supplied through the bias switch 70, which is also ganged for operation with the left-right transfer control 25, to supply an erase bias signal to either of the erase heads EL or ER associated with the corresponding record-playback units L and R. The switches 66a, 66b, and 70 shown in FIG. 3, as well as switches 71a, 71b and 72a, 72b shown in that Figure, appear in switching position associated with the "left" position of the left-right transfer control 25, which means that the dictate station 12 is connected to the first record-playback unit L and the transcribe control 14 is connected to the second record-playback unit R.

Amplified audio message signals received from the dictate station pass through the switch 66a and along the line 78 to the audio record-playback head 79 of the record-playback unit L. The tone signals generated by the E/I oscillator unit 67 are supplied through the control input switch 66b along the line 80 to the control record-playback head 81 of record-playback unit L. The audio head 79 and the control head 81 are preferably, although not necessarily, separate heads that are positioned to record corresponding audio message signals or control tone signals on separate tracks of the tape or other recording medium utilized by the record-playback unit L.

When the left-right transfer control 25 is moved to the "right" position, the reverse of the switching position depicted in FIG. 3, audio message signals from the dictate station are supplied by the audio input switch 66a along the line 82 to the audio record-playback head 83 of the second record-playback unit R. Control tones from the E/I oscillator unit 67 are likewise supplied by the control input switch 66b along the line 84 to the control record-playback head 85 of the record-playback unit R.

While input recording to either selected record-playback unit of the dictation unit 11 is accomplished with a single set of record electronics that is switched to the selected record-playback unit, audio and control playback from each record-playback unit L and R is accomplished with separate sets of playback electronics that are dedicated to the respective record-playback units. Playback audio signals which are induced in the audio head 79 of record-playback unit L go to a preamplifier 89 which is dedicated to that audio head, and thence to the left audio output switch 71a. Control tone signals induced in the control head 81 by tape playback are likewise supplied to the dedicated preamplifier 90 and thereafter to the left control output switch 71b. The audio and control tone signals induced in the corresponding audio head 83 and control head 85 of record-playback unit R are likewise applied to corresponding dedicated preamplifiers 91 and 92 and thereafter to the right audio output switch 72a and the right control output switch 72b, respectively. The audio output switches 71a and 72a, as well as the control output switches 71b and 72b, are ganged together for simultaneous operation by the left-right transfer control 25, and these output switches are shown in FIG. 3 in the "left" position as previously mentioned. The output switches 71a, 71b and 72a, 72b, along with the audio input switches 66a, 66b and the bias switch 70, may be provided by separate poles of a multiple-pole double-throw switch that is part of the left-right transfer control 25, which is mounted on the dictation unit 11. It will be apparent to those skilled in the art that the aforementioned input and output switches for both audio signals and control signals can alternatively be provided by appropriate electromechanical relays, solid state switches, or the like.

With the audio output switches 71a and 72a in the "left" position shown in FIG. 3, it is seen that playback audio signals from the audio head 79 of record-playback unit L are applied by the left audio output switch 71a onto the line 95 and the contact 96a of the intercom on-off switch 96 to the audio output amplifier 97. The amplifier 97 is a non-dedicated amplifier which supplies audio playback signals along the audio path 55 for return to the dictate station 12, so that the dictator can listen to previously-recorded dictation. At the same time, audio playback signals from the audio head 83 of record-playback unit R are supplied by the right audio output switch 72a along the line 99 to the non-dedicated audio output amplifier 100, and thence through the contact 96b of the intercom on-off switch 96 to the audio path 57 for return to the dictation listening device 45.

It is thus seen that a two-way audio path is established from the dictate station to the audio head 79 of record-playback unit L, while a one-way audio path is concurrently established from the audio head 83 of record-playback unit R to the transcriber's listening device. When the left-right transfer control 25 is moved to the "right" position, the input switches 66a, 66b and the output switches 71a, 71b and 72a, 72b are all moved to their lower positions as shown in FIG. 3. Audio input signals from the dictate station are then supplied along line 82 to the audio head 83 of record-playback unit R, as previously described, and playback audio signals from the audio head 83 are directed by the right audio output switch 72a and the line 102 to the audio output amplifier 97 and return to the dictate station. Playback audio from the audio head 79 of record-playback unit L is concurrently applied by the left audio output switch 71a along the lines 103 and 99 to the audio output amplifier 100 and the transcriber listening device 45.

Output switching of the control signals is accomplished in a similar manner. With the left-right transfer control 25 in the depicted "left" position, playback control signals from the control head 81 of record-playback unit L are applied by the left control output switch 71b on the line 106 to the E signal sensor 107, which may be a band-pass filter or like device which operates to provide an output signal on the E line 108 in response to the appearance of a previously-recorded E tone signal on the tape or other medium associated with the record-playback unit L. Playback output from the control head 85 of record-playback unit R is concurrently applied by the right control output switch 72b along the line 109 to the I signal sensor 110, which may also be a band-pass filter or similar device for applying a control signal on the I line 111 in response to the appearance of a previously-recorded I signal on the tape or other medium associated with record-playback unit R.

When the control output switches 71b and 72b are moved to the lower positions by changing the left-right transfer control 25 to the "right" position, the E signal sensor 107 receives playback control signals from the control head 85 of record-playback unit R, while the I signal sensor 110 now receives playback control signals from the control head 81 of record-playback unit L. It is thus seen that the E signal sensor 107 always receives playback control signals only from the record-playback unit which is selected for connection to the dictate station, while the I signal sensor 110 always receives playback control signals only from the record-playback unit that is selected for transcription. The purpose of this treatment of E and I output control signals will become apparent below with respect to the control transfer switching means.

The previously-mentioned intercom on-off switch 96 and the talk-listen switch 115 are depicted in the normal positions in FIG. 3, in which the intercom function is not operational. When the intercom on-off switch 96 is moved to the "on" position, an audio path is established from the dictate station to the transcriber listening device 45 by way of the amplifier 65, the line 116, the contact 115b of the talk-listen switch 115 in "listen" position, and the contact 96b of the switch 96. The dictator can thus speak directly to the secretary or other person within hearing range of the listening device 45. When the intercom on-off switch is "on," an audio response path from the dictation unit 11 back to the dictate station 12 is obtained by moving the talk-listen switch 115 to the "talk" position, wherein the microphone 117 and preamplifier 118 are connected through switch contacts 115a and 96a for amplification at 97 and return to the dictate station along the audio path 55. The microphone 117 may be built into the dictation unit 11, as seen in FIG. 1. Appropriate intercom signalling circuitry is described below with respect to the control transfer switching means.

Associated with the audio and control record-playback heads of the record-playback units L and R are the respective record relays 120L and 120R. Each of these record relays receives operating power from the control transfer switching means described below, and it will be seen that a particular record relay is energized only while recording is actually occurring. The contacts 120La and 120Lb of the record relay 120L appear in the energized "record" position for illustrative purposes in FIG. 3, while the contacts 120Ra and 120Rb of the record relay 120R appear in the unenergized "playback" position in that Figure.

Each of the record relay contacts operates to ground a selected side of the record-playback head associated with that contact, so that a signal path is established through the record-playback head. Considering the record relay contacts 120Ra and 120Rb associated with the audio head 83 and the control head 85 of record-playback unit R, it is seen that the sides x, x of the audio head 83 and the control head 85 are each grounded, along with the corresponding signal input lines 82 and 84. The sides y, y of the heads 83 and 85 thus become the signal output sides, and are respectively connected to the dedicated preamplifiers 91 and 92.

Considering next the audio head 79 and the control head 81 of record-playback unit L, it is apparent that the sides y, y of such heads are likewise connected to provide signal outputs to the prospective dedicated preamplifiers 89 and 90 so long as the record relay contacts 120La and 120Lb remain in the unenergized position, which exists when a previously-recorded message is being played back to the dictate station and at all other times except when recording is actually occurring. Thus, the record relay 120L may be unenergized at times when the left-right transfer switch 25 is in the "left" position to establish audio and control interconnection between the dictate station and record-playback unit L.

When a "record" condition occurs, such as during dictation of a message when unit L is selected for dictation, the record relay 120L is energized in a manner described below and the record relay contacts 120L*a* and 120L*b* assume the position shown in FIG. 3 to ground the sides *y, y* of the audio head 79 and the control head 81. The inputs to the playback preamplifiers 89 and 90 have become grounded to silence playback operation of the record-playback unit L during recording, and the sides *x, x* of the heads 79 and 81 now provide signal inputs for the respective heads. The record relay 120L thus switches the audio and control heads of record-playback unit L between the record and playback functions without disturbing the position of the left output switches 71*a* and 71*b*, so as to permit the dedicated preamplifiers 89 and 90 to remain in circuit with the heads 79 and 81 during recording as well as playback.

The control transfer switching of the disclosed embodiment is described with respect to FIGS. 4A and 4B, in which the control functions associated with record-playback unit R are shown in FIG. 4A and the control functions associated with record-playback unit L are shown in FIG. 4B. It will be seen, however, that some control circuitry which selectively provides control signals to either of the record-playback units is located on only one of FIGS. 4A or 4B for clarity of illustration, and certain related control circuits are shown and described in separate FIG. 5. It should also be understood that there is an extent of deliberate overlap of the circuit portions shown in FIGS. 4A and 4B, along the parting line 130, so that the double-pole double-throw left-right switch of the transfer control 25 appears in both of such Figures to assist in understanding the control circuits. Only one such double-pole double-throw control transfer switch actually exists in the disclosed embodiment, however.

The tape movement control means and the related control means for each of the record-playback units L and R are connected to receive both dictate-command signals, originating at the dictate station 12, and transcribe-command signals, originating at the transcribe control 14 or at the controls contained on the dictation unit 11. The individual tape movement control means for each of the record-playback units are connected to a separate control bus corresponding to each such unit, and the control means are selectively responsive either to the dictate command or the transcribe command signals as a function of the voltage level which appears on the control buses. The left-right transfer control 25 determines the voltage levels that appear on the two control buses and thus determines whether a particular record-playback unit is responsive to control by dictate-command signals or transcribe-command signals.

In the following discussion, the control means that separately appear in each of the record-playback units are discussed with reference to unit R shown in FIG. 4A and with reference numerals bearing the suffix "R," and it should be understood that corresponding control means bearing the suffix "L" on corresponding reference numerals are present in record-playback unit L shown in FIG. 4B. Control circuits that are common to both record-playback units have neither an "L" nor an "R" suffix.

The record-playback unit R includes an E-mark printer 131R and an I-mark printer 132R, each of which actuates a printing or marking element associated with the position indicator 22R of the dictation index 20R on the dictation unit 11. The E-mark and I-mark printers, when energized, make a mark on the index strip 21R in a manner known to those skilled in the art, and it will be understood that such printers may comprise thermal printers for visibly marking on heat-sensitive index strips, or may alternatively comprise marking perforators, scribes, or other devices which place a visible indicium on an index strip. The two E-mark printers 131R and 131L are connected to a common control line 133, while the two I-mark printers 132R and 132L are connected to another common control line 134. The mark printers of the record-playback unit R are connected in parallel to receive operating voltage on the line 135R, while the mark printers of the record-playback unit L receive operating voltage on a corresponding line 135L. The E-mark print control line 133 is selectively connected to ground through the transistor 136 (FIG. 4B) which is turned on for a predetermined interval of time by the timer 137 in response to an input signal on the E-mark line 138 in response to a command signal received from the dictate station. The I-mark control line 134 is selectively connected to ground in a similar fashion by the transistor 139 (FIG. 4A) for a predetermined interval by the timer 140, in response to a I-mark signal on the line 141 in response to a command signal from the dictate station. Each of the timers 137 and 140 may be provided by any suitable circuit device such as a monostable multivibrator which drives the corresponding transistor 136 or 139 to conductivity, in response to appearance of a ground on the control line 138 or 141, for an interval of time sufficient for operation of the corresponding mark printer. Selection of the particular record-playback printers L or R is accomplished by the voltage applied to the lines 135L and 135R.

The record-playback unit R has a control bus 144R which, in the drawing, is split into an upper or emitter portion E and a lower or base portion B. The emitter portion and base portion of the control bus 144R are connected together in common with the pole 25*a* of the left-right transfer control 25, while the corresponding emitter and base portions of the left control bus 144L are connected to the pole 25*b* of the transfer control. The two poles 25*a* and 25*b* of the left-right transfer switch 25 are ganged together, and the transfer control 25 is interconnected with a source of positive voltage 145 and ground potential 146 such that either position of the transfer control places one of the control buses at positive potential and the other control bus at ground potential. In the "left" position of the transfer control 25 shown in FIGS. 4A and 4B, the left control bus 144L is at ground while the right control bus 144R is at positive voltage 145, and it will be shown that ground potential on the left control bus conditions the record-playback unit L for dictate operation while the positive voltage on the right control bus conditions the record-playback unit R for transcribe operation. Reversing the position of the left-right transfer control 25 to the "right" position places the right control bus 144R at ground potential and the left control bus 144L at positive voltage, causing a corresponding reversal of the operating conditions for the record-playback units. It will be understood by those skilled in the art that the use of "positive" operating voltage for the control buses is determined by the polarities of transistors and other switching devices employed in the circuitry, and that the present invention could be redesigned to operate with a switching voltage of negative polarity without departing from the spirit of the present invention. It is also apparent that the E-mark printer 131R and I-mark printer 132R can receive operating power on the line 135R only when the transfer switch 25 is in the "right position," since that print control line is connected to the left control bus 144L. For example, an E-mark signal appearing on line 138 is applied to timer 137 and causes transistor 136 to be turned on for an interval of time, placing at ground potential the line 133 connected in common to both the left and right E-mark printer. Only the E-mark printer 131L receiving operating voltage from the transfer switch 25 can function, in the depicted positions of transfer switch 25, to mark the index strip corresponding to the record-playback unit L selected for dictation.

Control means associated with the record-playback units are the play solenoid 148R, the scan solenoid 149R, the spindle drive motor 150R, and the capstan drive motor 151R. The play solenoid 148R, when actuated, is connected through suitable linkage (not shown) to move the audio head 83, the control head 85, and the conventional tape drive pinch roller (not shown) into engagement with the tape of a cassette in unit R. The scan solenoid 149R, when energized, is connected through suitable linkage (not shown) to engage only the audio head 83 and control head 85, but not the pinch roller, with the cassette tape, so that tape can be moved past the heads for control tone scanning at a high rate of speed relative to normal record-playback speed. Such linkages are known to those skilled in the art.

The spindle drive motor 150R is operative to drive the take-up and supply spindles of the record-playback unit R in a forward direction when the line 152R is returned to ground, or in the reverse direction when line 153R is returned to ground. The capstan drive motor 151R, when energized, operates in the conventional manner to rotate the conventional capstan (not shown) of the record-playback unit R.

Each of the foregoing control means is selectively energized by control circuits that are conditioned for response either to dictate-command or transcribe-command signals in a manner that is explained with reference to the play circuit 157R of the play solenoid 148R. The play circuit includes a transistor 158R with a circuit connected through the diode 159R to the emitter portion E of the control bus 144R. The transistor 158R further has a base that is connected through the diode 160R to the base portion B of the control bus 144R. Dictate command signals on line 160 (FIG. 4B) are supplied through the diode 161, the line 162, the cassette tray switch 163R (FIG. 4A), the line 165R, and the diode 164R to the base circuit of the transistor 158R. The cassette tray switches 163L and 163R are interlock switches that sense the presence or absence of a cassette in the respective record-playback unit L and R. The cassette tray switches are depicted in normally-closed position corresponding to the presence of a cassette in each of the record-playback units, and it can be seen that the respective dictate command circuits to diodes 164L and 164R can be completed only when the respective cassettes are present. A dictate command signal, in the present embodiment, is provided by the appearance of a positive control voltage on the dictate line 160.

A transcribe-command signal is provided by the presence of ground potential on the transcribe-listen line 168, caused by closure of the listen switch 169 in the transcribe control unit 14, with a return to ground being provided through the normal positions of the fast-forward switch 209 and the reverse switch 193, by line 167 and the scan control 27, the erase/rewind switches 267R and 267L, and the secretary-start switch 266 shown in normal position in FIG. 5. The transcribe-listen signal is connected through diode 170R to the emitter of transistor 158R in the play circuit 157R.

When the left-right transfer control 25 is in the depicted "left" position, positive voltage appears on the right control bus 144R and is applied through the diode 160R to the base of the transistor 158R. The emitter diode 159R is backbiased at this time by the positive voltage on the emitter portion E of the control bus. If the transcribe-listen switch 169 is now closed, the emitter of transistor 158R goes to ground potential through the diode 170R and an operating circuit is completed through the play solenoid 148R to move the record-playback heads and the pinch roller into contact with the tape of a cassette in the record-playback unit R. The transcriber is thus able to hear messages that were previously recorded on the tape. Grounding the transcribe-listen line 168 applies the same transcribe-listen signal to the play circuit 157L, but the base of transistor 158L is presently unable to receive drive current through the diode 160L and the now-grounded left control bus 144L. The left play circuit 157L is thus nonresponsive to the presence of a transcribe-listen signal on line 168.

Assume now the presence of a dictate-command signal from line 160 appearing at the anode of diode 164R. Since the base of transistor 158R is already biased at positive potential from the right control bus 144R, and since there is no path to ground for the emitter of that transistor, the transistor 158R of play circuit 157R remains nonconductive in the presence of the dictate-command signal. The emitter of transistor 158L in the left play circuit 157L is presently at ground potential through the diode 159L and the left control line 144L, however, and so the positive-potential dictate-command signal from line 160 is applied through cassette switches 163L and the diode 164L to turn on transistor 158L. A circuit is thus completed through the play solenoid 148L, causing the audio head, the control head, and the pinch roller of record-playback unit L to engage the tape for forward tape movement. The dictate signal on the line 160 is also applied to the base of a transistor 173L in the erase control 174L, turning on that transistor to energize both the record relay 120L (for record-playback head switching as previously described) and completing a circuit through line 175 to bias oscillator 69. It is seen, accordingly, that the record-playback unit L is conditioned for response only to dictate command signals by the ground potential applied to the left control bus 144L, while the record-playback unit R is conditioned to respond only to transcribe control signals by the positive bias voltage present on the right control bus 144R. It will also be understood that reversing the left-right transfer switch 25 to the "right" position conditions the record-playback unit R to respond only to dictate command signals, and conditions the record-playback unit L to respond only to transcribe command signals.

Other control circuits for the record-playback units of the disclosed embodiment include the rewind control transistor 178R, which is conditioned by base circuit diode 179R to be operable only during the transcribe mode of record-playback unit R. The rewind control transistor 178R becomes conductive to run the spindle drive motor 150R in the reverse-winding direction when the line 271R is grounded, as discussed below. The diode 233 prevents the scan solenoid 149R from operating when the rewind control transistor is conductive, so that no audio signals will be heard during erase rewinding.

The reverse control 181R and the fast-forward control 182R are conditioned for dictate or transcribe operation in a manner identical to that of the play circuit 157R, and respectively control operation of the spindle drive motor 150R in the reverse-winding and forward-winding modes. The scan solenoid 149R is also engaged when either of the reverse control 181R or the forward control 182R is conductive.

The capstan drive motor 151R is operative whenever the capstan control 184R is conductive, and it can be seen that the capstan control functions in a manner similar to the play control 157R to be conditioned for dictate or transcribe operation in response to operation of the left-right transfer switch 25. When the record-playback unit R is conditioned for transcribe operation, as depicted in FIG. 4A, the capstan control 184R turns on the capstan drive motor 151R in response to a ground condition occurring on the transcribe start line 185. When the transfer switch 25 is reversed to place the record-playback unit R in the dictate mode, the capstan drive motor 151R is turned on in response to appearance to a positive control voltage on the seize line 186. The source of the transcribe start and seize signals is described below with respect to FIG. 5.

The tape motion functions briefly discussed above are now described from the standpoint of the several control functions that are available in the dictate or transcribe modes of operation. The "transcribe listen" mode is discussed above, and occurs when the switch 169 in the transcribe control unit 14 is closed to place the transcribe-listen line 168 at ground potential, thereby turning on the play circuit transistor 158R whose base circuit is receiving positive voltage from the transfer switch 25. When "dictate listen" is commanded by the appearance of a positive voltage on the line 190, the positive dictate-listen command voltage is applied to the control line 191 connected through diodes to the base circuits of the play transistors 158L and 158R. Since the emitter portion of the left control bus 144L is at ground potential through the transfer switch 25, the positive dictate-listen voltage on the line 191 turns on the left play transistor 158L and completes the circuit through the play solenoid 148L to establish "play" operation of record-playback unit L. The same positive voltage on the dictate-listen control line 191 cannot affect the play transistor 158R, however, as previously described. The diodes 164L and 164R are back-biased by the positive dictate-listen voltage on the control line 191, so that neither erase control circuit 174L or 174R can operate during the "play" function.

The "transcribe reverse" function is obtained when the switch 193 in the transcribe control unit 114 is operated to ground the line 194 leading to the transcribe-reverse control line 195. This ground signal is applied through diode 196R to the emitter of the reverse control transistor 197R in the reverse-control circuit 181R, thereby turning on the reverse control transistor and establishing a path to ground for the line 153R of the spindle drive motor 150R. Grounding the line 153R causes the spindle drive motor 150R to operate in a "reverse" direction for fast-rewind movement of tape in a cassette associated with record-playback unit R. This fast-rewind movement continues until the switch 193 in the transcribe control unit 14 is opened.

The "dictate reverse" function is obtained by providing a positive control voltage on the dictate-reverse control line 200, so that the reverse control transistor 197L whose emitter is grounded can receive positive control voltage through the diode 201L. While dictate reverse movement of tape is commanded by the appearance of a positive control voltage on the dictate reverse line 202, the dictate-reverse tape movement ceases either when the command signal disappears from the line 202 or when a E-scan control signal appears on line 108 (FIGS. 3 and 4B), indicating that the dictator has reversed back to the end of the previously-dictated message. When the dictate-reverse signal first appears on the line 202, that signal causes a high output to appear on the output 204 of the NAND gate 203a associated with the latch circuit 203. The high signal on line 204, combined with the positive high dictate-reverse command signal already present on line 202, are supplied to the NAND gate 205 to provide a low output which is inverted at 206 and applied as a high or positive signal to the dictate-reverse line 200.

If the dictator releases the reverse control switch before an E-scan control signal is received, the high input disappears from line 202 and the output of gate 205 goes high, thereby causing the dictate-reverse signal to disappear from the control line 200. If an E-scan control signal is detected before the reverse switch is released by the dictator, that control signal on line 108 is inverted at 207 and applied as an input to the NAND gate 203b of latch circuit 203. The output of gate 203b thus goes high, causing the appearance of a low signal on line 204 and the disappearance of the dictate-reverse signal on control line 200. When the dictator releases the reverse switch, the disappearance of a high signal on line 202 causes the latch 203 to reset to its initial state, whereupon dictate-reverse can again be commanded. A cassette in the record-playback unit selected for dictation can thus be entirely rewound by the dictator, in increments corresponding to occurrences of E-scan signals that were previously recorded on the tape by the dictator.

The "fast forward" control function is obtained in the transcribe mode by closing the switch 209 in the transcribe control unit 14 to place the line 210 at ground potential, thereby placing the transcribe-fast forward control line 211 at ground potential. This ground condition on the control line 211 is applied to the fast forward controls 182R and 182L, and turns on the transistor 212R by providing a ground path for the emitter circuit thereof. The line 152R of the spindle drive motor 150R is thereby grounded, causing the spindle drive motor to wind tape in the "forward" direction at a fast rate relative to normal tape movement during dictate or transcribe operation.

The "dictate fast forward" mode is obtained when a positive control signal appears on the line 213 and thence on the dictate-fast forward control line 214. The positive dictate-fast forward signal is applied to the base of transistor 212L, turning on that transistor and grounding line 152L of spindle drive motor 150L for fast-forward movement of tape in the record-playback unit L.

E and I marks are printed on an index strip, and corresponding E and I control signals are recorded on tape, in response to dictator-originated signals which appear on either the E control line 138 or the I control line 141. Printing an E or I mark is accomplished by activating the corresponding printer for a predetermined interval of time as described previously, while concurrent recording of the corresponding E or I control signal on the tape is accomplished by moving the tape in a record mode while the appropriate control tone is applied to the control head of the record-playback unit which is selected for dictation. Considering first the case of E marks, an E command from the dictate station appears as a ground potential applied to the E control line 138. That ground condition is applied as an input to the timing circuit 137, which turns on the transistor 136 for a brief period of time sufficient to allow the E-mark printers to make a visible index on an appropriate index strip 21. Only the E-mark printer 131L functions in the indicated "left" mode of the transfer switch 25, however, since no input voltage is applied to the other E-mark printer 131R. Printing of an appropriate E-mark on the index strip 21L thus occurs.

The ground condition on E control line 138 is also applied through the diode 218 and line 219 as an input to the control signal timing circuit 220 (FIG. 4A), which operates in response to the ground input condition to provide a positive record control signal on the line 221 through the diode 222 to the line 162 previously discussed with respect to the "dictate" function. This positive signal on the line 162 is applied through the cassette switches 163L and 163R, and operates the erase control 174L and the play control 157L for an interval determined by the control signal timing circuit 220. The tape in the record-playback unit L is thus moved in the forward-record mode, and it will be recalled that a suitable E signal tone is applied to the control head 81 of record-playback unit L at this time. A suitable E signal is thus recorded on tape concurrently with the E mark applied to the index strip of the corresponding record-playback unit. The control mark recording occurs for a period of approximately three seconds in an actual embodiment of the present invention, although a greater or lesser time could be provided as desired.

Operation of the I mark function is similar to the previously-described E mark function, with the dictator's operation of the I control switch causing a ground signal condition to appear on the I control line 141 to operate the print timing circuit 140 and the control signal timing circuit 220 for corresponding periods of time. A ground circuit is thus completed through the transistor 139 for the operating voltage applied to the I mark printer 132L, and forward recording movement of tape in the record-playback unit L concurrently occurs for recording an I control tone on the tape.

The control system of the disclosed embodiment allows previously-recorded E signals to control tape movement only on a record-playback unit which is switched to the dictate mode, as described above, and previously-recorded I signals can control operation only of a record-playback unit in the transcribe mode. The "I-scan" operation is controlled by the I-scan circuit 225 (FIG. 4A), in response to the appearance on line 226 of a ground condition comprising a logic-low input to the NAND gate 225a of the I-scan circuit. The absence of a sensed I-scan signal at this time causes the input line 227 to the NAND gate 225b to be high, and it is presently assumed that the input lines 228 are high at this time. Consequently, the transistor 229 is turned on to place the scan line 230 at ground potential. Ground is thus applied to the emitter circuit of reverse control transistor 197R, causing the spindle drive motor 150 to commence operating in the fast-reverse mode. The scan solenoid 149R is also connected to ground through the diode 232 and the transistor 197R, so that the audio head 83 and the control head 85 of record-playback unit R are moved into transducing relation with the rewinding tape. The record-playback unit R is now operating in fast-rewind mode and is conditioned to sense any previously-recorded control tones. When a previously-recorded I control tone is sensed by the control head 85, an I scan signal appears on line 111 (FIG. 3) and is inverted at 232 to provide a low input to the NAND gate 225b, thereby reversing the previous state of the I-scan latch circuit 225 and returning transistor 229 to the nonconductive state. The scan transistor 197R and scan solenoid 149R are thus released, terminating the reverse-scan operation in the record-playback unit which is in transcribe mode. The transcriber may now operate that record-playback unit in the conventional "listen" mode to hear the special instructions or other message corresponding to the I mark on the tape. The existence of I marks on the tape is, of course, visually indicated by index marks that were printed on the corresponding index strip 21 when the I marks were recorded. The tape on record-playback unit R can then be rewound to stop automatically at any other I signals on the tape, if desired.

The presence of a ground condition on left scan line 231 cannot operate the left scan transistor 178L when the record-playback unit L is in dictate mode, since the base of the left scan transistor is also at ground potential.

The present dictation system includes a cassette alarm signal device 236 which generates an audio signal for return along the audio path to the dictate station 12, in response to certain abnormal operating conditions in the record-playback unit selected for the dictate operating mode. The abnormal operating conditions which, in the disclosed embodiment, activate the cassette alarm signal circuit 236 are the presence of a prerecorded cassette in the record-playback unit selected to receive dictation, the absence of a cassette in the selected record-playback unit, or the absence of commanded tape motion, although those skilled in the art will recognize that other abnormal conditions can also trigger the cassette alarm signal circuit. The prerecorded-cassette signal is obtained from the prerecorded-cassette switches 237L an 237R, shown in FIG. 4A, and it will be understood that such switches may be any conventional device which senses the presence or absence of the removable prerecorded-cassette tabs on conventional Philips-type compact cassettes. Each of the prerecorded cassette switches 237L and 237R supplies the positive record-command signal on line 162 to the respective NAND gates 238L or 238R only when a prerecorded cassette is contained in the corresponding record-playback unit L or R.

Since the sensed presence of a prerecorded cassette, or the absence of any cassette, should provide a cassette alarm signal only when a record-playback unit is in dictate mode, the cassette alarm output lines 235L and 235R go to separate NAND gates 238L and 238R along with a connection to the control bus of the opposite-designation record-playback unit. Since the output of the gate 238L, for example, must be low to initiate the cassette alarm signal circuit 236 through the NAND gate 239, the presence of a high signal input to the gate 238L from the right control bus 144R arms that gate to provide a logic-low output signal if the presence of a prerecorded cassette in record-playback unit L is sensed by the switch 237L. The appearance of a low output on gate 238L causes the output of gate 239 to go high, activating the cassette alarm signal circuit 236. The presence of a low input signal applied to the gate 238R from the left control bus 144 at this time causes the output of gate 238R to remain high irrespective of the output of prerecorded cassette switch 237R, preventing the record-playback unit R from generating a cassette alarm signal while in transcribe mode.

The presence of tape motion in each record-playback unit is detected by separate tape motion sensors 242L and 242R, which are separately associated with the respective record-playback units to provide output signals to corresponding amplifier-inverter transistors 243L and 243R in the presence of tape movement. Each of the tape motion control lines 244L and 244R, accordingly, exhibit a logic-low ground potential when tape is actually moving in the corresponding record-playback unit and exhibit a positive logic-high potential at all other times. Tape motion sensors are known to those skilled in the art.

The tape motion control line 244L provides an input to the NAND gate 247L and the line 244R provides an input to the NAND gate 247R; each of these NAND gates also receives a high signal from the dictate station motion command line 248 whenever a dictate command signal appears on the dictate line 160, the listen line 190, the reverse line 202, or the fast forward line 213. The gate 247L is also connected to the right control bus 144R and the gate 247R is connected to the left control bus 144L, so that only the gate which receives a logic-high signal from one of such control buses can provide a high output signal to activate the cassette alarm signal through the NAND gate 239. For example, when the left tape motion sensor 242L senses the absence of tape motion, control line 244L applies a high input to gate 247L which is currently receiving another high input from the right control line 144R. Motion command line 248 remains low so long as no tape movement function is commanded from the dictate station, however, and so the output of gate 247L remains high and the cassette alarm signal is not activated by that output. When a dictate function control signal appears, for example, on the dictate line 160, the motion command line goes high and the control line 244L goes low provided that tape motion commences. If no tape motion is indicated by the tape motion sensor 242L, however, a logic-low condition appears at the output of gate 247L and a cassette alarm signal is supplied on the audio line to the dictate station. The right tape motion sensor 242R operates in identical fashion when the gate 247R is enabled by the presence of a high input signal from the left control bus 144L in response to movement of the transfer switch 25 to the "right" position.

A record-playback unit which is in transcribe mode can be operated for fast erase, as described below with respect to FIG. 5, following actuation of a control switch which is manually actuated to initiate an erase sequence and is mechanically latched therein until the tape is fully erased. The manual erase switches, which are separately provided for each record-playback unit L and R and which may be of conventional design, are released from the latched "erase" position when the release solenoid 252 is energized. The release solenoid is energized when transistor 253 is made conductive and when either of switches 254L and 254R has been closed by aforementioned manual operation of the corresponding erase switch. The transistor 253 is turned on in response to a logic-low signal from either NAND gate 255L or 255R in response to a high signal on the corresponding tape motion control line 244L or 244R denoting the absence of tape motion in the corresponding record-playback unit. Each of gates 255L and 255R is enabled by the presence of high inputs on the right and left control buses, so that only a record-playback unit in transcribe mode is operative to terminate a fast-erase operation in response to the absence of tape motion. It will be seen, accordingly, that the tape motion sensors 242L and 242R are effectively switched between a dictate operating mode and a transcribe operating mode, by operation of the transfer switch 25.

The presence of dictated material on either of the record-playback units is indicated by the aforementioned work lamps 26L and 26R; the work lamp for a corresponding record-playback unit in dictate mode is turnd on when that unit is seized by a dictate station, as explained below, and remains on after seizure terminates and after the unit is subsequently switched to transcribe mode. Referring to FIG. 5, identical work lamp circuits 260L and 260R have work lamps 26L and 26R which are provided by light-emitting diodes, and which are connected across the respective erase heads EL and ER associated with the corresponding record-playback units. Seizure by the dictate station 12 causes the transistor 261 to become conductive in a manner described below, thereby applying positive voltage to the seize line 186 which extends to the control circuit shown in FIGS. 4A and 4B and also to the NAND gates 262L and 262R. With the left-right transfer switch 25 in the "left position", the gate 262L also receives a positive voltage from right control bus 144R so that the latch circuit 263L turns on the work lamp driver transistor 264L. An operating circuit for the work lamp 26L is thus established at the time of seizure, for the record-playback unit which is switched to dictate mode. The latch circuit 263L keeps the driver transistor 264L turned on after seize voltage disappears from the gate 262L, and after the positive voltage disappears from the right control bus 144R.

The erase head EL is actuated by a transcriber only by a predetermined switching arrangement. The secretary-start switch 266, located on the dictation unit 11, is operated to connect the transcribe-start line 185 to ground potential, thereby turning on the capstan drive motor of the record-playback unit which is placed in transcribe mode by the transfer switch 25. The erase-/rewind switch 267L is moved to contact 268L, and the zero-index switch 269L is placed in the closed position. The zero-index switches 269L and 269R are normally-open switches which are controlled by the physical location of the respective position indicators 22L and 22R to become closed only when the corresponding position indicator is manually moved leftward to the zero-index position.

The point 270L is placed at ground potential by the foregoing switch operations, thereby establishing an operating circuit through the erase head EL and also through the rewind control transistor 178L (FIG. 4B) by way of line 271L. Ground potential at point 270L also clears the previously-set latch circuit 263L, although the work lamp 26L presently remains on by a path through diode 274L to ground. The rewind control transistor 178L is now conductive, and the spindle drive motor 150L operates in the reverse-wind direction to move the tape past the now-operative erase head EL. When the tape is fully rewound so that no further tape motion is possible, the erase mode is automatically terminated by actuation of the release solenoid 252 as previously described. The switches 254L and 254R (FIG. 4A) may be respectively ganged for closure when the corresponding erase/rewind switches 267L and 267R are manually moved to the contacts 268L and 268R.

The aforementioned I-scan operation can be initiated only when both of the erase/rewind switches 267L and 267R are in the normal or non-erase positions 275L and 275R, the secretary-start switch 266 is turned on to ground the transcribe-start line 185, and the scan control switch 27 is operated to contact the scan start line 226. Operation of the I-scan latch circuit 225 (FIG. 4A) is thereby initiated, as describe above.

Intercom signalling is provided by the appearance of a positive voltage on the intercom control line 280 (FIG. 4B) as long as a suitable intercom control switch remains energized at the dictate station. The intercom control signal operates a buzzer 281 to signal the secretary, and also turns on the intercom latch circuit 282 to illuminate the lamp 283 on the dictation unit 11. The lamp 283 remains illuminated after the intercom signal disappears from the intercom control line 280, leaving a positive visible reminder of the intercom call. The lamp 283 is extinguished by momentarily operating the normally-closed switch 284 to break the holding circuit through the intercom latch circuit 282. The switch 284 may be ganged for operation with the switch 96, shown in FIG. 3.

The seize circuit 290 and the dictate command circuit 291, both of which appear on FIG. 5, are best explained with reference to the dictate station embodiment shown in FIG. 6. The dictate station 12 has a "busy" line 292 and a ground return line 293 which are permanently in circuit with the corresponding lines on FIG. 5. The dictate station 12 also has the following lines which extend to the dictation unit 11 as indicated in FIG. 5 and which are connected to separate poles of a normally-open relay 294 within the dictate station: the seize/dictate audio line 295, the playback audio line 296, the listen/E mark line 297, the reverse/I mark line 298, the dictate line 299, and the fast forward/intercom line 300. The seize/dictate audio line 295 is connected through the diode 301 to the common line 302, which is connected through the diodes 303a and 303b to the base of a transistor 304 and also, through resistance 305, to the hook switch 306. One contact 307 of the hook switch is returned to the common line 302, and the contact 307 comprises the "hang-up" position occupied by the hook switch when the handset 33 of the dictate station 12 is supported by the cradle 32 and not in use. The hook switch 306 is moved to the "seize" contact 308 when the handset is removed from the cradle 32 to place the dictate station 12 in operation.

The emitter circuit of transistor 304 is returned to the common line 302, while the collector circuit of that transistor goes to ground 293 through the resistance 294 in parallel with the base-emitter circuit of the transistor 309. The light-emitting diode 310 is connected from the busy line 292 to ground, and provides the "busy" lamp 37 of the dictate station.

The seize contact 308 of the hook switch 306 is connected through the diode 311 to the ungrounded common line 312, along with one side of the coil of relay 294. A transistor 313 comprising an audio preamplifier for the dictate station microphone 314 is connected between the common line 312 and the normally-open relay contact for the seize/dictate audio line 295. A speaker or similar listening device 315 is connected between common line 312 and the normally-open relay contact for the playback audio line 296. Th circuitry within the broken line 317 is not part of the dictate station seizure circuit, and is described below.

When the hook switch 306 of the dictator station 12 is in the hang-up position 307 and the dictation unit 11 is available to receive dictation, the busy line 292 receives no operating voltage from the dictation unit. The power supply voltage from the dictation unit 11 is present on the seize/dictate audio line 295 at this time. When an attempted seizure of the dictation unit occurs by moving the hook switch 306 to the seize position 308, an emitter-base circuit for the transistor 304 is completed through the seize position of the hook switch, the diode 316, the coil of relay 294, the busy line 292, and the light-emitting diode 310 to ground 293. Since the common line 302 is receiving positive power supply voltage from the dictation unit, sufficient current now flows through the transistor 304 and resistance 294 to provide base drive current for the transistor 309, which also turns on. An alternative path to ground through the now-conductive transistor 309 is thus provided for the seize contact 308 of the hook switch 306. The current drain of transistors 304 and 309 through the seize/dictate audio line 295 causes the transistor 261 of the seize circuit 290 (FIG. 5) to turn on, with the result that positive power supply voltage from the dictation unit 11 is now returned to the dictate station 12 along the busy line 292. This "busy" voltage on line 292 flows through the coil of relay 294 to ground through conductive transistor 309, whereupon the relay 294 pulls in to connect the audio and control lines 295, 296, 297, 298, 199, and 300 with the remainder of the dictate station 12. Current is also supplied through the transistor 261 to the seize line 186 of the dictation unit 11 to turn on the capstan drive motor of the record-playback unit which is selected for the dictate mode. Once the relay 294 pulls in, the transistor 313 in the dictate station is turned on to provide a steady current drain on line 295 which maintains the seized condition of the dictation unit 11. The busy voltage returned to the dictate station 12 on the busy line 292 illuminates the light-emitting dioded 310 to indicate that the dictation unit 11 is now seized and ready to receive dictation.

The present dictation system can be used with more than one dictate station connected in parallel to a dictation unit 11, in a manner similar to conventional central dictation systems. Where one dictate station of a multiple-station system is already in use, the seize voltage on busy line 292 is applied to all idle dictate stations to illuminate the light-emitting diodes 310 therein, and to back-bias the diode 316. If the hook switch 306 of an idle dictate station is inadvertently moved to seize position 308 while the dictation unit 11 is already seized, no ground path for the base of transistor 304 can be established and the dictate station is prevented from seizing the in-use dictation unit.

The microphone 314 and listening device 315 of the dictate station 12 are typically contained in a hand-held unit such as the handset 33, which also includes the switches necessary to provide various command functions to the dictation unit 11. Such switches, on the disclosed embodiment, include the aforementioned multi-position switch 34, which selectively establishes connection between the common line 312 and the line 299a leading to the normally-open "dictate" line contact of relay 294, the "pause" line 320", the listen line 297a leading to the normally-open relay contact for the listen/E mark line 297, and the "reverse" line 298a leading to the normally-open relay contact for the reverse/I mark line 298. The normally-open "fast forward" switch 321, when closed, connects the relay contact of the fast forward/intercom line 300 through the intercom switch 322 to common line 312 provided that the multi-position switch 34 is on the pause line 320.

The control lines 297, 298, 299, and 300 each provide two separately-selectable control functions which are obtained by connecting the appropriate line either to ground potential or to a fixed reference voltage relative to ground. For example, the listen/E mark line 297 is placed at ground potential when the multi-position switch 34 is moved to the listen position 297a, since the normally-open E mark switch 325 is in its normal position as shown in FIG. 6. When the E mark switch 325 is closed, however, the listen/E mark line 297 becomes connected to the voltage which is present on the busy line 292. The voltage on the busy line 292 is similarly applied to the reverse/I mark line 298 by closing the normally-open I mark switch 328, and to the fast forward/intercom line 300 by operating the intercom switch 322 to contact 322a. As described below, the dictate line 299 can also be used to provide an additional control function by providing an optional switch 346 for selectively interconnecting that line to the voltage on the busy line 292. The "record" indicator lamp 40 is illuminated whenever the switch 34 is moved to the "dictate" line 299a position.

Since each of the three dictate command lines 297, 298, and 300 selectively controls two separate functions by being placed either at a reference supply voltage or at ground potential, the dictate command circuit 291 (FIG. 5) must be able to differentiate between the presence of either command signal state, as well as the absence of any command signal state, on each line. Taking the fast forward/intercom line 300 as an example, that line provides an input to the intercom comparator 331 and to the fast forward comparator 332. These comparators also receive reference voltage from a voltage divider circuit including the reference voltage 333, the resistance 334, the series-connected midpoint resistance 335, the resistance 336, and ground. The fast forward/intercom line 300 is also connected to the junction of midpoint resistances 335 through a resistance, so that the fast forward/intercom line is normally maintained at some predetermined stabilizing voltage. It is apparent that the intercom comparator 331 receives a reference voltage on line 337 which is greater than the voltage at stabilizing point 335a, while the fast forward comparator 332 receives a reference voltage on line 341 which is less than the voltage at that stabilizing point.

When the fast forward switch 321 at the dictate station 12 is closed, the fast forward/intercom line 300 goes to ground potential and thus goes lower than the reference voltage applied to the negative input of fast forward comparator 332. A positive reference voltage is thus placed on the fast forward line 213 by the comparator 332. When the intercom switch 322 in the dictate station is moved to contact 322a, however, the fast forward/intercom line 300 goes to the voltage level on line 292 and thereby exceeds the reference voltage applied to the negative input of intercom comparator 331. A corresponding positive intercom signal thereby appears on the intercom line 280.

Remote Transfer of Record-Playback Units

While the foregoing embodiment of the present dictation system can be transferred between separate record-playback units at the control of the transcriber, a dictation system according to the present invention can also be provided which permits the separate record-playback units of the dictation unit 11 to be controlled either by the dictator at the dictate station 12, or by the transcriber at the dictation unit. Transfer of record-playback units at the control of the dictator can effectively double the amount of dictation time which is available without operator intervention at the dictation unit 11. The present dictator-controlled transfer system includes safeguards which effectively prevent either the dictator or the transcriber from accomplishing a commanded transfer of record-playback units which is already under the control of the other party.

Turning to FIG. 6, the previously-mentioned optional control switch 346 at the dictate station 12 functions as a cassette change switch when moved from the normal dictation position, shown in FIG. 6, to the contact 346a so that the voltage on the busy line 292 of an in-use dictate station is applied to the dictate line 299. The dictate command circuit 291 of FIG. 5 includes the optional voltage comparator 348, shown in phantom, which receives an input from the dictate line 299. The dictate line 299 thus causes a positive transfer command signal to appear on the output 349 of the comparator 348 whenever the cassette change switch 346 is operated to place positive supply voltage on the dictate line, in addition to causing the aforementioned dictate command signal to appear on line 160 whenever the dictate line 299 is grounded by the multiple position switch 34 at the dictate station 12.

The transfer command signal which appears on line 349 is supplied to the remote transfer circuit indicated generally at 351 in FIG. 7. The remote transfer circuit includes a modified left-right transfer control 25' provided by double-pole double-throw contacts of the relay 352, and it should be understood that the transfer control 25' provides the same switching of voltage levels on the left and right control busses as described above with respect to the transfer switch 25 shown in FIGS. 4A and 4B. The coil of the relay 352 is energized when the transistor 353 in series with the coil is gated on by an appropriate signal on the output line 354 of the flip-flop 355. The complementary output line 356 of the flip-flop 355 turns on the transistor 357, and it will be understood that the outputs 354 and 356 of the flip-flop alternately turn on the respective transistors 353 and 357 in response to input signals on the trigger line 358 to the flip-flop. When output line 354 of the flip-flop is low, accordingly, transistor 353 does not conduct and relay 352 is unenergized so that the transfer control 25' is in the position depicted in FIG. 7 to place the record-playback unit R in "dictate" mode and the record-playback unit L in "transcribe" mode. When the state of the flip-flop 355 is reversed in response to an input on the trigger line 358, the transistor 353 becomes conductive and the coil of relay 352 is energized to reverse the foregoing status of the transfer control 25'.

The remote transfer circuit 351 operates in the following manner, with the assumptions that the dictation unit 11 is presently seized so that positive voltage appears on the busy line 292, and that the dictation unit is not in use for transcribing as shown by the open secretary-start switch 266'. When a person at the dictate station wishes to transfer between record-playback units L and R, the cassette change switch 346 at the dictate station is operated as aforementioned to place a positive control voltage on the dictate line 299. A positive transfer command signal thus appears on the output line 349 of the comparator 348, causing the transistor 362 (FIG. 7) to conduct. The differential voltage appearing across resistance 363 turns on the trigger transistor 364, thereby providing an input on the trigger line 358 to the flip-flop 355 to trigger the flip-flop and reverse the operative status of the relay 352. Light-emitting diodes 365a and 365b, controlled by the sequential operation of the transistors 353 and 357, are located at the dictation unit 11 to indicate the current status of the record-playback units.

If a person at the dictation unit 11 attempts to operate the transfer control 25' by depressing the secretary cassette transfer control 368 while the dictation unit is seized by a dictate station, the positive voltage on busy line 292 appears across the resistance 369 and back-biases the diode 370 so that current cannot flow through the resistance 363 and the control 368. Accordingly, transfer between record-playback units cannot be accomplished at the dictation unit 11 while the dictation unit is seized for dictation.

When the dictate station 12 is placed on-hook, voltage disappears from the busy line 292 and the secretary transfer control 368 becomes effective to supply trigger signals to the flip-flop 355 for operating the transfer control relay 352. If the dictation unit 11 is now energized for transcription by closing the secretary-start switch 266', thereby applying operational ground to the transcribe control in the manner described above, the output line 349 becomes clamped to ground through the diode 371. An attempt by the dictator to transfer between record-playback units by operating the cassette change switch 346 at the dictate station 12 is now ineffective, since the input of transistor 362 is clamped to ground through the diode 371 and the now-closed secretary-start switch 266'. Thus, transfer of record-playback units is prevented while the dictation unit 11 is in use for transcription.

It is desirable with a dictator-operated cassette transfer system to provide an indication at the dictate station 12 of the record-playback unit which is presently selected to receive dictation. A cassette-in-use indicator is provided by the circuit 317, shown in FIG. 6, in which the light-emitting diodes 375 and 376 are alternately illuminated in response to operation of the transfer control 25' to denote the particular record-playback unit presently selected for dictation. The light-emitting diodes 375 and 376 are connected in series across the busy line 292 and the common line 312, which is connected to the ground line 293 when the dictate station 12 becomes seized as mentioned above. The emitter-collector circuits of the complementary transistors 377 and 378 are respectively connected in shunt across the light-emitting diodes 375 and 376. The bases of the transistors 377 and 378 are connected in common through resistance 379 to the playback audio line 296, when the dictate station relay 294 is energized upon seizure. It will now be seen that the appearance of a positive control voltage on the playback audio line 296 causes transistor 377 to conduct, thereby shunting and extinguishing light-emitting diode 375. The appearance of ground on the playback audio line 296, alternatively, turns on the transistor 378 to shunt and extinguish the light-emitting diode 376.

The appearance of either a positive control voltage or a DC ground on the playback audio line 296 is provided through the connection 380 to the playback audio line, shown in FIG. 5, and the resistance 381 (FIG. 7) to one control bus associated with the transfer control 25'. The resistance 381, along with the resistance 379 in the indicator circuit 317 at the dictate station, provides a high-impedance path to playback audio signals which appear on the playback audio line 296. The capacitances 382 (FIG. 6) and 383 (FIG. 5) keep the control voltages from affecting the playback audio path to the dictate station.

It will be apparent that the foregoing relates only to a preferred embodiment of the present invention, and that numerous alternatives and modifications may be made therein without departing from the spirit and the scope of the invention as set forth in the following claims.

We claim:

1. Apparatus for recording and playing back dictated messages, comprising:
   dictate station means including a means for producing message signals and a means for producing dictation control signals;
   dictation receiving means remotely situated from said dictate station means;
   signal transmission means interconnecting said dictate station and said dictation receiving means;
   said dictation receiving means including first and second recording means either of which is selectably operative for recording and playing back dictated messages received along said signal transmission means from said dictate station means;
   each of said recording means being operative to receive a separate message recording medium for said recorded messages;
   each of said recording means being selectably operative in a dictation mode for recording dictated messages received over said signal transmission means from said dictate station and for playing back said dictated messages to said dictate station, and in a transcribe mode for playing back previously recorded messages;
   transcribe control means selectably operative to produce transcribe control signals for playing back messages previously recorded by either of said recording means; and
   signal transfer means associated with said dictation receiving means and selectably operative to either a first mode or a second mode;
   said signal transfer means in said first mode operatively interconnecting said dictate station control means with said first recording means only, and operatively interconnecting said transcribe control means with said second recording means only;
   said signal transfer means in said second mode operatively interconnecting said dictate station means with said second mode operatively interconnecting said dictate station means with said second recording means only and operatively interconnecting said transcribe means with said first recording means only;
   each of said first and second message recording means including at least one function control means which is selectably operative to control a certain function of the corresponding message recording means;

the said function control means which control the same certain function of each corresponding message recording means being connected to receive both dictation control signals and transcribe control signals which require said same certain function;

each of said function control means being conditioned by a first kind of transfer signal to respond only to said dictation control signals and being conditioned by a second kind of transfer signal to respond only to said transcribe control signals; and said transfer means in said first mode supplying said first kind of transfer signals to said function control means of said first message recording means and supplying said second kind of transfer signal to said function control means of said second message recording means, and in said second mode supplying said second kind of transfer signal to said function control means of said first message recording means and supplying said first kind of transfer signal to said function control means of said second message recording means.

2. Apparatus as in claim 1, further comprising:

signal means associated with said dictation receiving means and operative independently of said signal transfer means to indicate the presence of a dictated and untranscribed message on either of said recording means.

3. Apparatus as in claim 1, further comprising:

means associated with said dictation receiving means to indicate the extent of any dictated messages recorded on each of said separate message recording media.

4. Apparatus as in claim 1, further comprising:

index means associated with said dictation receiving means and operative in response to a control signal received from said dictate station means to record an index signal on the recording means which is operatively interconnected with said dictate station by said signal transfer means; and index responsive means associated with said dictation receiving means and responsive to playback of an index signal previously recorded on said recording means to control a selected operating function of said first and second recording means.

5. Apparatus as in claim 1, further comprising:

index signal means associated with said dictation receiving means and operative in response to a control signal from said dictate station to record an index signal on the recording means which is operatively interconnected with said dictate station by said signal transfer means;

rewind control means at said dictate station to provide a rewind signal which controls reverse movement of the recording medium only in said recording means which is operatively interconnected with said dictate station; and rewind latch means responsive to said rewind signal and also responsive to playback of a previously-recorded said index signal to command said reverse movement of said operatively interconnected recording means until said rewind signal terminates or is interrupted by playback of previously-recorded said index signal.

6. Apparatus for recording and playing back dictated messages, comprising:

dictate station means including a means for producing message signals and a means for producing dictation control signals;

dictation receiving means remotely situated from said dictate station means;

signal transmission means interconnecting said dictate station and said dictation receiving means;

said dictation receiving means including first and second recording means either of which is selectably operative for recording and playing back dictated messages received along said signal transmission means from said dictate station means;

each of said recording means being operative to receive a separate message recording medium for said recorded messages;

each of said recording means being selectably operative in a dictation mode for recording dictated messages received over said signal transmission means from said dictate station and for playing back said dictated messages to said dictate station, and in a transcribe mode for playing back previously recorded messages;

transcribe control means selectably operative to produce transcribe control signals for playing back messages previously recorded by either of said recording means;

signal transfer means associated with said dictation receiving means and selectably operative to either a first mode or a second mode;

said signal transfer means in said first mode operatively interconnecting said dictate station control means with said first recording means only, and operatively interconnecting said transcribe control means with said second recording means only;

said signal transfer means in said second mode operatively interconnecting said dictate station means with said second mode operatively interconnecting said dictate station means with said second recording means only and operatively interconnecting said transcribe means with said first recording means only;

first transfer control means associated with said dictate station means for selectively providing a transfer control signal;

second transfer control means associated with said dictation receiving means for selectively providing a transfer control signal; and said signal transfer means being responsive to a said transfer control signal from either of said first or second transfer control means to change between said modes of operation.

7. Apparatus as in claim 6, further comprising:

lockout means associated with said dictation receiving means and operative in response to operative engagement by said dictate station means of either of said recording means to prevent said second transfer control means from changing a selected mode of operation.

8. Apparatus as in claim 6, further comprising:

lockout means associated with said dictation receiving means and operative in response to operative engagement by said transcribe control means of either of said recording means to prevent said first transfer control means from changing a selected mode of operation.

9. Apparatus for recording and playing back dictated messages, comprising:

dictate station means including a means for producing message signals and a means for producing dictation control signals;

dictation receiving means remotely situated from said dictate station means;

signal transmission means interconnecting said dictate station and said dictation receiving means;

said dictation receiving means including first and second recording means either of which is selectably operative for recording and playing back dictated messages received along said signal transmission means from said dictate station means;

each of said recording means being operative to receive a separate message recording medium for said recorded messages;

each of said recording means being selectably operative in a dictation mode for recording dictated messages received over said signal transmission means from said dictate station and for playing back said dictated messages to said dictate station, and in a transcribe mode for playing back previously recorded messages;

transcribe control means selectably operative to produce transcribe control signals for playing back messages previously recorded by either of said recording means; and signal transfer means associated with said dictation receiving means and selectably operative to either a first mode or a second mode;

said signal transfer means in said first mode operatively interconnecting said dictate station control means with said first recording means and operatively interconnecting said transcribe control means with said second recording means;

said signal transfer means in said second mode operatively interconnecting said dictate station means with said second mode operatively interconnecting said dictate station means with said second recording means and operatively interconnecting said transcribe means with said first recording means;

index means associated with said dictation receiving means and operative in response to a control signal received from said dictate station means to record an index signal on the recording means which is operatively interconnected with said dictate station by said signal transfer means;

said index means being selectively operative to record mutually distinctive index signals of either a first kind or a second kind on the selected recording means;

index responsive means associated with said dictation receiving means and responsive to playback of an index signal previously recorded on said recording means to control a selected operating function of said first and second recording means; and said index responsive means being responsive to playback only of said first kind of index signal when said selected recording means is interconnected with said dictate station means, and being responsive to playback only of said second kind of index signal when said selected recording means is interconnected with said transcribe means.

10. Apparatus as in claim 9, wherein:

each of said recording means includes movement means selectively operative to move the corresponding recording medium either in a reverse direction or in a normal forward direction of recording medium movement during message recording or playback; and said index responsive means is operatively associated with each said movement means and with said signal transfer means to stop selected reverse movement of the recording medium only in response to said first kind of index signal when said selected recording means is operatively interconnected with said dictate station means, and to stop selected reverse movement of said recording medium only in response to said second kind of index signal when said selected recording means is operatively interconnected with said transcribe means.

11. Apparatus for recording and playing back dictated messages, comprising:

dictate station means including a means for producing message signals and a means for producing dictation control signals;

dictation receiving means remotely situated from said dictate station means;

signal transmission means interconnecting said dictate station and said dictation receiving means;

said dictation receiving means including first and second recording means either of which is selectably operative for recording and playing back dictated mesages received along said signal transmission means from said dictate station means;

each of said recording means being operative to receive a separate message recording medium for said recorded messages;

each of said recording means being selectably operative in a dictation mode for recording dictated messages received over said signal transmission means from said dictate station and for playing back said dictated messages to said dictate station, and in a transcribe mode for playing back previously recorded messages;

transcribe control means selectably operative to produce transcribe control signals for playing back messages previously recorded by either of said recording means;

signal transfer means associated with said dictation receiving means and selectably operative to either a first mode or a second mode;

said signal transfer means in said first mode operatively interconnecting said dictate station control means with said first recording means only, and operatively interconnecting said transcribe control means with said second recording means only;

said signal transfer means in said second mode operatively interconnecting said dictate station means with said second mode operatively interconnecting said dictate station means with said second recording means only and operatively interconnecting said transcribe means with said first recording means only;

each of said first and second recording means having a motion responsive means operative in response to the absence of commanded movement of the message recording medium to provide a motion signal; and alarm signal means operative to provide a signal at said dictate station means in response to a motion signal only from the motion responsive means of said recording means which is operatively interconnected with said dictate station means by said signal transfer means.

12. Apparatus for receiving a dictated message from a dictation source while simultaneously playing back a previously recorded message to a transcriber, comprising:

first message recording means selectably operative to record and play back dictated messages on a first recording medium;

second message recording means selectably operative to record and play back dictated messages on a second recording medium which is separate from said first recording medium;

dictation control means operative to supply dictation control signals and dictated messages from a dictation signal source to either of said first and second message recording means;

transcribe control means operative to supply transcribe control signals from a transcription signal source to either of said first and second message recording means, and additionally operative to receive playback messages from either of such recording means;

transfer means operatively associated with said dictation control means and said transcribe control means, and with said first and second message recording means, said transfer means being selectably operable either to a first switching mode or a second switching mode;

said transfer means when in said first mode operatively connecting said first message recording means for operation only in response to said dictation control signals and operatively connecting said second message recording means for operation only in response to said transcribe control signals;

said transfer means when in said second mode operatively connecting said first message recording means for operation only in response to said transcribe control signals and connecting said second message recording means for operation only in response to said dictation control signals;

each of said first and second message recording means including at least one function control means which is selectably operative to control a certain function of the corresponding message recording means;

the said function control means which control the same certain function of each corresponding message recording means being connected to receive both dictation control signals and transcribe control signals which require said same certain function;

each of said function control means being conditioned by a first kind of transfer signal to respond only to said dictation control signals and being conditioned by a second kind of transfer signal to respond only to said transcribe control signals; and said transfer means in said first switching mode supplying said first kind of transfer signal to said function control means of said first message recording means and supplying said second kind of transfer signal to said function control means of said second message recording means, and in said second switching mode supplying said second kind of transfer signal to said function control means of said first messaage recording means and supplying said first kind of transfer signal to said function control means of said second message recording means.

13. Apparatus for recording and playing back dictated messages, comprising:

dictate station means including a means for producing message signals and a means for producing dictation control signals;

dictation receiving means remotely situated from said dictate station means;

signal transmission means interconnecting said dictate station and said dictation receiving means;

said dictation receiving means including first and second recording means either of which is selectably operative for recording and playing back dictated messages received along said signal transmission means from said dictate station means;

each of said recording means being operative to receive a separate message recording medium for said recorded messages;

each of said recording means being selectably operative in a dictation mode for recording dictated messages received over said signal transmission means from said dictate station and for playing back said dictated messages to said dictate station, and in a transcribe mode for playing back previously recorded messages;

transcribe control means selectably operative to produce transcribe control signals for playing back messages previously recorded by either of said recording means;

signal transfer means associated with said dictation receiving means and selectably operative to either a first mode or a second mode;

said signal transfer means in said first mode operatively interconnecting said dictate station control means with said first recording means only, and operatively interconnecting said transcribe control means with said second recording means only;

said signal transfer means in said second mode operatively interconnecting said dictate station means with said second mode operatively interconnecting said dictate station means with said second recording means only and operatively interconnecting said transcribe means with said first recording means only;

each of said recording means including erase means selectably operative only at said dictation receiving means to erase the entire recording medium respectively associated with the corresponding recording means; and means operatively connecting each of said erase means to said signal transfer means to permit operation only of that erase means for the recording means which is operatively interconnected with said transcribe control means.

14. Apparatus as in claim 13, wherein each of said first and second recording means comprises:

indicator means which is operable to indication relative to the corresponding message recording medium, and which is selectably settable to a predetermined indication; and each of said erase means being operatively associated with said indicator means for the corresponding message recording means so as to be operative for erasing only if said corresponding indicator means is set to said predetermined indication.

15. Apparatus for receiving a dictated message from a dictation source while simultaneously play back a previously recorded message to a transcriber, comprising:

first message recording means selectably operative to record and play back dictated messages on a first recording medium;

second message recording means selectably operative to record and play back dictated messages on a second recording medium which is separate from said first recording medium;

dictation control means operative to supply dictation control signals and dictated messages from a dictation signal source to either of said first and second message recording means;

transcribe control means operative to supply transcribe control signals from a transcription signal source to either of said first and second message recording means, said additionally operative to receive playback messges from either of such recording means;

transfer means operatively associated with said dictation control means and said transcribe control means, and with said first and second message recording means, said transfer means being selectably operable either to a first switching mode or a second switching mode;

said transfer means when in said first mode operatively connecting said first message recording means for operation only in response to said dictation control signals and operatively connecting said second message recording means for operation only in response to said transcribe control signals;

said transfer means when in said second mode operatively connecting said first message recording means for operation only in response to said transcribe control signals and connecting said second message recording means for operation only in response to said dictation control signals;

first means associated with said dictation control means for selectively providing a transfer control signal;

second means for selectively providing a transfter control signal;

said transfer means being operative in responsee to a said control signal from either of said first and second means to change between said modes of operation; and lockout means operative in response to selection of a mode of operation by either of said first or second means to prevent a change between said modes of operation by the other of said first or second means.

* * * * *